(12) United States Patent
Sakiyama et al.

(10) Patent No.: US 10,585,202 B2
(45) Date of Patent: Mar. 10, 2020

(54) ACOUSTIC SENSING WITH AZIMUTHALLY DISTRIBUTED TRANSMITTERS AND RECEIVERS

(71) Applicant: Schlumberger Technology Corporation, Sugar Land, TX (US)

(72) Inventors: Naoki Sakiyama, Tokyo (JP); Wataru Izuhara, Tokyo (JP); Hiroshi Hori, Sagamihara (JP); Toshimichi Wago, Tokyo (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 348 days.

(21) Appl. No.: 15/623,456

(22) Filed: Jun. 15, 2017

(65) Prior Publication Data
US 2018/0003845 A1 Jan. 4, 2018

Related U.S. Application Data

(60) Provisional application No. 62/356,906, filed on Jun. 30, 2016.

(51) Int. Cl.
*G01V 1/50* (2006.01)
*E21B 47/00* (2012.01)
(Continued)

(52) U.S. Cl.
CPC ............ *G01V 1/50* (2013.01); *E21B 47/0005* (2013.01); *E21B 47/082* (2013.01); *E21B 49/00* (2013.01);
(Continued)

(58) Field of Classification Search
CPC ............... G01V 1/50; G01V 2210/626; G01V 2210/1299; G01V 2210/1429;
(Continued)

(56) References Cited

U.S. PATENT DOCUMENTS 3,304,538 A 2/1967 Zill
3,564,914 A 2/1971 Desai
(Continued)

FOREIGN PATENT DOCUMENTS

WO WO2015163852 A1 10/2015

OTHER PUBLICATIONS

Office Action issued in related U.S. Appl. No. 15/623,436 dated Dec. 13, 2018, 33 pages.

*Primary Examiner* — Daniel L Murphy
(74) *Attorney, Agent, or Firm* — Sara K. M. Hinkley

(57) ABSTRACT

A downhole tool having a transmitter array with azimuthally spaced transmitters and receiver arrays with azimuthally spaced receivers. Methods of operation include transmitting an acoustic signal from an individual one of the transmitters, sensing an attribute of the acoustic signal with the receivers, and evaluating a characteristic of a portion of a downhole feature based on response signals generated by the first and second receivers. Each response signal is indicative of the acoustic signal attribute sensed by the corresponding receivers. This is repeated with different individual ones of the transmitters and receivers until the evaluated portions of the downhole feature collectively extend around a wellbore.

18 Claims, 12 Drawing Sheets

(51) Int. Cl.
*E21B 49/00* (2006.01)
*E21B 47/08* (2012.01)
*E21B 47/18* (2012.01)

(52) U.S. Cl.
CPC ...... *E21B 47/18* (2013.01); *G01V 2210/1299* (2013.01); *G01V 2210/1429* (2013.01); *G01V 2210/626* (2013.01); *G01V 2210/6242* (2013.01)

(58) Field of Classification Search
CPC ........ G01V 2210/6242; E21B 47/0005; E21B 49/00; E21B 47/082; E21B 47/18
USPC .......................................................... 367/25
See application file for complete search history.

(56) References Cited

U.S. PATENT DOCUMENTS

| | | | |
|---|---|---|---|
| 3,835,953 A * | 9/1974 | Summers | E21B 47/082 367/27 |
| 4,255,798 A | 3/1981 | Havira | |
| 4,346,460 A * | 8/1982 | Schuster | G01V 1/44 181/102 |
| 4,524,432 A | 6/1985 | Johnson | |
| 4,757,479 A * | 7/1988 | Masson | G01V 1/44 367/35 |
| 4,896,303 A | 1/1990 | Leslie et al. | |
| 5,089,989 A | 2/1992 | Schmidt et al. | |
| 5,354,956 A | 10/1994 | Orban et al. | |
| 5,377,160 A | 12/1994 | Tello et al. | |
| 5,398,215 A * | 3/1995 | Sinha | G01V 1/44 367/27 |
| 8,755,248 B2 * | 6/2014 | Wang | G01V 1/46 367/31 |
| 8,861,307 B2 | 10/2014 | Pabon | |
| 2005/0065730 A1 | 3/2005 | Sinha | |
| 2018/0003843 A1 | 1/2018 | Hori et al. | |
| 2018/0003844 A1 | 1/2018 | Sakiyama et al. | |

* cited by examiner

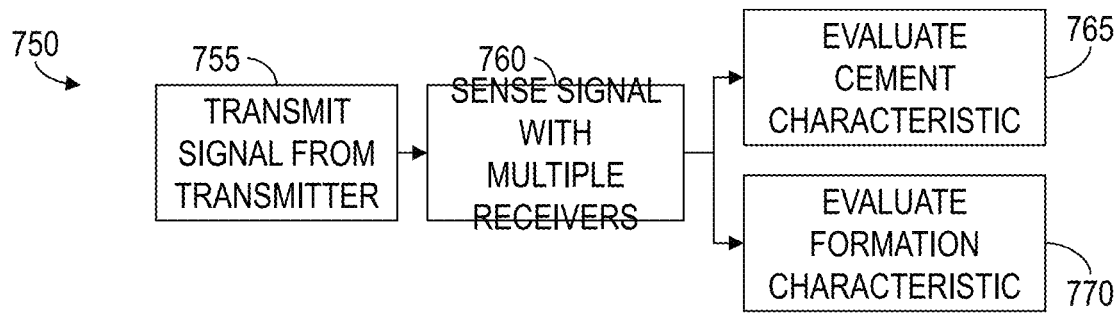
FIG. 24
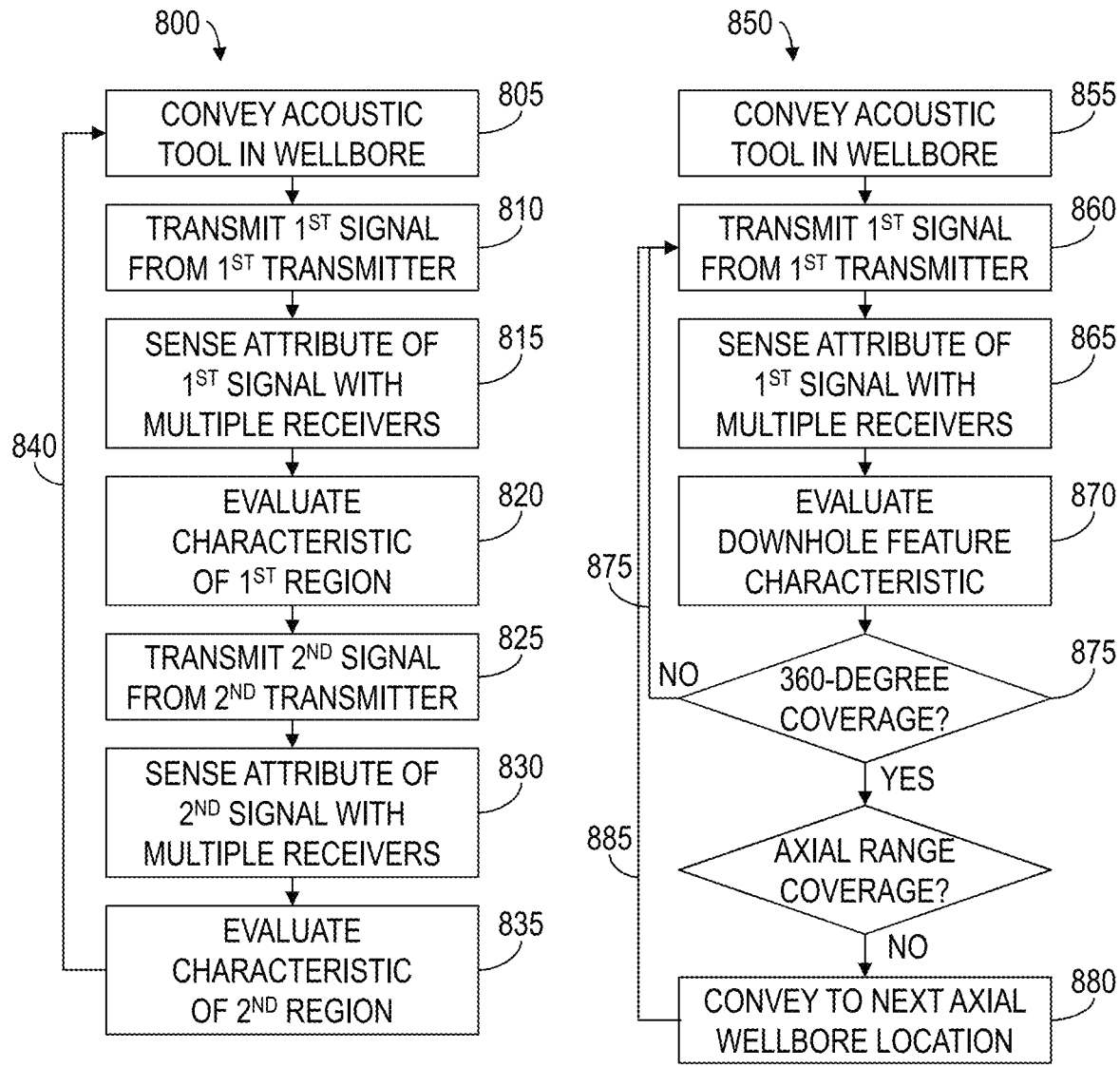
FIG. 25
FIG. 26

ACOUSTIC SENSING WITH AZIMUTHALLY DISTRIBUTED TRANSMITTERS AND RECEIVERS

CROSS-REFERENCE TO RELATED APPLICATIONS

This application claims the benefit of and priority to U.S. Provisional Application No. 62/356,906, entitled "Acoustic Sensing with Azimuthally Distributed Transmitters and Receivers," filed Jun. 30, 2016, the entire disclosure of which is hereby incorporated herein by reference.

BACKGROUND OF THE DISCLOSURE

The formation of an oil and gas well includes securing a metal casing within a wellbore via cement forming an annular structure between the sidewall of the wellbore and the outer diameter of the casing. Downhole acoustic tools may be utilized for cement bond logging (CBL) to evaluate bonding quality between the casing and the cement, such as by evaluating amplitudes of casing arrivals traveling from a transmitter to the casing and refracted to a sensor axially separated from the transmitter. Downhole acoustic tools may also or instead be utilized for radial bond logging (RBL) to evaluate azimuthal variation of the cement bonding, such as by evaluating casing arrivals across sensors at various azimuthal locations around the downhole acoustic tool.

However, CBL and RBL both resort to casing arrival amplitudes, which are sensitive to the position of the downhole acoustic tool within the casing. Consequently, eccentering of the downhole acoustic tool from the axis of the casing perturbs casing arrival amplitudes, which can result in inaccurate interpretation of the cement bonding quality.

Moreover, the measurement frequency range of acoustic logging tools are generally below 30 kilohertz (kHz), including for evaluating formation elastic properties in uncased, open-holes, and for evaluating cement bond quality in cased-holes. This frequency range limits the spatial resolution with which the acoustic logging tools can provide elastic properties of formations/muds in open-holes, and cement bonding quality around the casing in cased-holes.

To evaluate elastic properties of a formation having intrinsic and/or stress-induced anisotropy, open-hole acoustic logging may utilize monopole or multipole (e.g., dipole or quadrupole) logging. However, in azimuthally heterogeneous formations (e.g., bedding intersecting the wellbore in a horizontal well), logging results are less accurate, because averaged elastic properties are measured around the wellbore. Unipole logging may also be utilized, with an azimuthally focused (or localized) transmitter placed on one side of the tool, and with waveforms measured on the same side of the tool. However, because the transmitter and the array receivers are typically placed on just one side of the tool, the tool is rotated to provide azimuthally full coverage around the wellbore, which is possible with logging-while-drilling (LWD) implementations of the acoustic tool but not wireline and other non-LWD conveyance means, because non-LWD conveyance means generally cannot be manipulated at the surface in a manner permitting accurate rotational positioning of the acoustic tool.

To evaluate casing cement in cased-holes, the acoustic logging may utilize a frequency of about 100 kHz. However, the impact of tool eccentering becomes larger because such logging is based just on amplitudes of measured casing signals. With lower frequencies, and/or in the presence of a second casing or a formation having a compressional slowness less than about 200 microseconds per meter (µs/m), additional inaccuracies may occur due to the acoustic signal wavelength not being sufficiently smaller than the features intended to be detected.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes transmitting an acoustic signal from a transmitter of a downhole tool positioned within a wellbore, and sensing an attribute of the acoustic signal with each of multiple receivers of the downhole tool. The receivers include a first receiver axially offset from and azimuthally aligned with the transmitter, a second receiver axially offset from and azimuthally aligned with the transmitter and the first receiver, a third receiver axially and azimuthally offset from the transmitter, and a fourth receiver axially and azimuthally offset from the transmitter, the first receiver, and the third receiver.

The present disclosure also introduces a method that includes conveying, within a wellbore, a downhole tool that includes a transmitter array, a first receiver array, and a second receiver array. The transmitter array includes multiple transmitters azimuthally distributed around a longitudinal axis of the downhole tool at a first axial location of the downhole tool. The first receiver array includes multiple first receivers azimuthally distributed around the longitudinal axis at a second axial location axially offset from the first axial location. The second receiver array includes multiple second receivers azimuthally distributed around the longitudinal axis at a third axial location axially offset from the first and second axial locations. A first acoustic signal is transmitted from a first one of the transmitters. An attribute of the first acoustic signal is sensed with at least first and second ones of the first receivers and at least first and second ones of the second receivers. A characteristic of a first region is evaluated based on first signals generated by the at least first and second ones of the first receivers and the at least first and second ones of the second receivers. The first signals are each indicative of the sensed attribute of the first acoustic signal. A second acoustic signal is transmitted from a second one of the transmitters. The attribute of the second acoustic signal is sensed with at least third and fourth ones of the first receivers and at least third and fourth ones of the second receivers. A characteristic of a second region is evaluated based on second signals generated by the at least third and fourth ones of the first receivers and the at least third and fourth ones of the second receivers. The second signals are each indicative of the sensed attribute of the second acoustic signal. The first and second regions are either regions of cement substantially surrounding a casing within the wellbore or regions of a subterranean formation into which the wellbore extends.

The present disclosure also introduces a method that includes comprising conveying, within a wellbore, a downhole tool that includes a transmitter array and first and second receiver arrays. The transmitter array includes multiple transmitters azimuthally spaced around a longitudinal axis of the downhole tool at a first axial location of the downhole tool. The first receiver array includes multiple first receivers azimuthally spaced around the longitudinal axis at a second axial location axially offset from the first axial location. The second receiver array includes multiple second receivers azimuthally spaced around the longitudinal axis at a third axial location axially offset from the first and second axial locations. The method also comprises transmitting an acoustic signal from an individual one of the transmitters, and sensing an attribute of the acoustic signal with individual ones of the first and second receivers. The individual ones of the first and second receivers include at least two of the first receivers and at least two of the second receivers. The method also includes evaluating a characteristic of a portion of a downhole feature based on response signals generated by each of the individual ones of the first and second receivers. Each response signal is indicative of the acoustic signal attribute sensed by the corresponding individual one of the first and second receivers. The portion azimuthally corresponds to two of the individual ones of the first and second receivers having the greatest relative azimuthal offset. The method also includes repeating the transmitting, sensing, and evaluating with different individual ones of the transmitters and corresponding first and second receivers until the evaluated portions of the downhole feature collectively extend through about 360 degrees around the longitudinal axis.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 24 is a flow-chart diagram of at least a portion of an example implementation of a method according to one or more aspects of the present disclosure.

FIG. 25 is a flow-chart diagram of at least a portion of an example implementation of a method according to one or more aspects of the present disclosure.

FIG. 26 is a flow-chart diagram of at least a portion of an example implementation of a method according to one or more aspects of the present disclosure.

DETAILED DESCRIPTION

Figure 1:
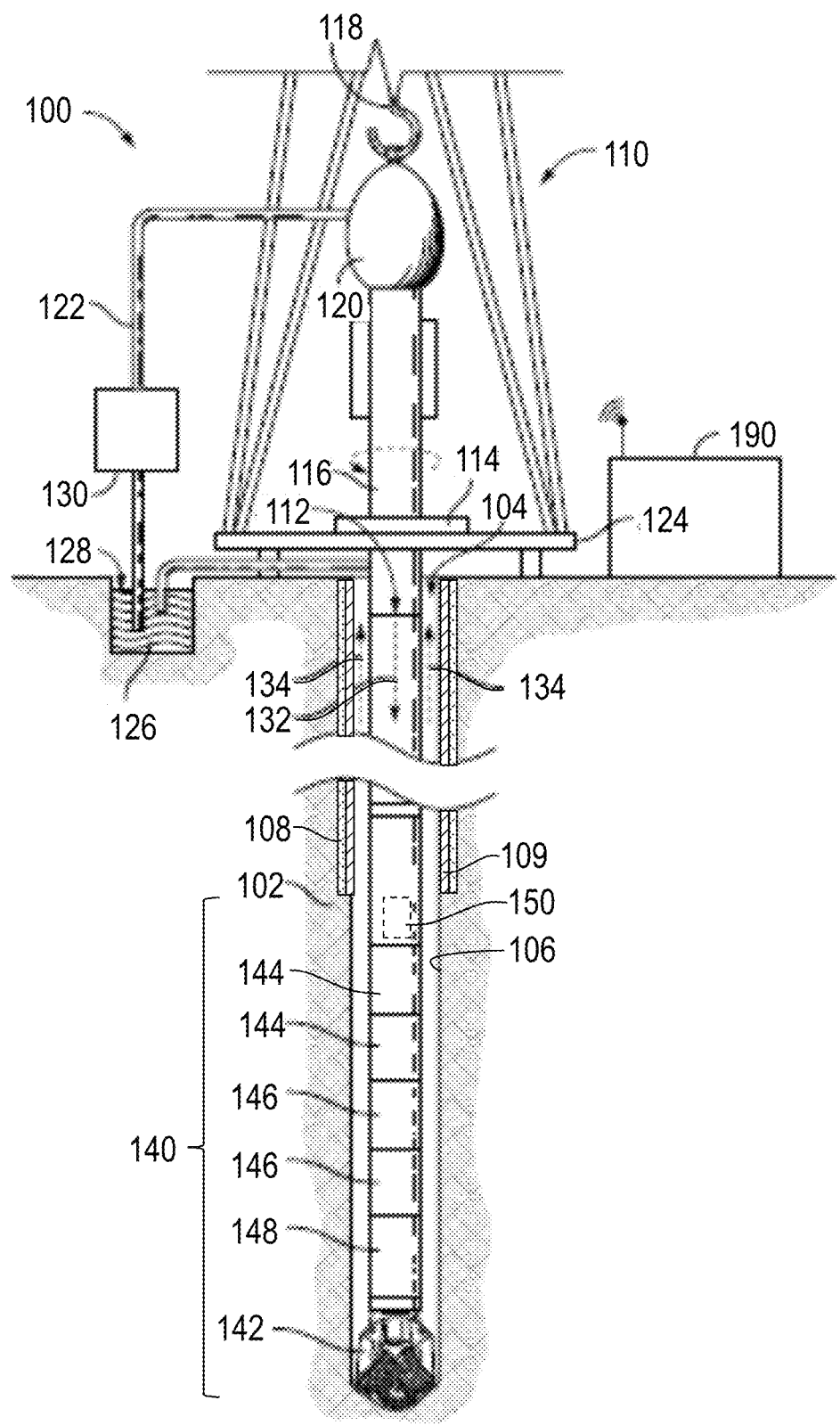
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

The present disclosure introduces one or more aspects that may be utilized to correct acoustic signal perturbation caused by tool eccentering. For example, the correction may be determined by processing travel times of casing amplitudes. If the downhole acoustic tool is eccentered, a sensor at one azimuthal location of the tool that is closer to the casing wall will detect the casing arrivals earlier than another sensor at an opposite azimuthal location of the tool. One or more aspects of the present disclosure pertain to determining a correction factor that varies as a function of the arrival times of the casing arrival amplitudes, and perhaps other environmental variables, to compensate for the error of the casing amplitudes brought about by the tool eccentering.

FIG. 1 is a schematic view of an example wellsite system 100 to which one or more aspects of the present disclosure may be applicable. The wellsite system 100 may be onshore or offshore. In the example wellsite system 100 shown in FIG. 1, a wellbore 104 is formed in one or more subterranean formation 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or in place of, those presently illustrated and described.

As shown in FIG. 1, a drillstring 112 suspended within the wellbore 104 comprises a bottom hole assembly (BHA) 140 that includes or is coupled with a drill bit 142 at its lower end. The surface system includes a platform and derrick assembly 110 positioned over the wellbore 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. As described above, the drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the wellbore 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the wellbore 104. For example, the BHA 140 may comprise one or more logging-while-drilling (LWD) modules 144, one or more measurement-while-drilling (MWD) modules 146, a rotary-steerable system and motor 148, and perhaps the drill bit 142. Of course, other BHA components, modules, and/or tools are also within the scope of the present disclosure, and such other BHA components, modules, and/or tools may be positioned differently in the BHA 140.

The LWD modules 144 may comprise a downhole acoustic tool for evaluating bonding quality of cement 108 securing a casing 109 that lines at least a portion of the wellbore 104, and/or for evaluating portions of the formation 102 surrounding the wellbore 104. Example aspects of such acoustic tools are described below.

The MWD modules 146 may comprise one or more devices for measuring characteristics of the drillstring 112 and/or the drill bit 142, such as for measuring weight-on-bit, torque, vibration, shock, stick slip, tool face direction, and/or inclination, among others. The MWD modules 156 may further comprise an apparatus (not shown) for generating electrical power to be utilized by the downhole system. This may include a mud turbine generator powered by the flow of the drilling fluid 126. Other power and/or battery systems may also or instead be employed.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the amplitude and travel/arrival times of acoustic signals transmitted and received by an acoustic tool of the LWD modules 144. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
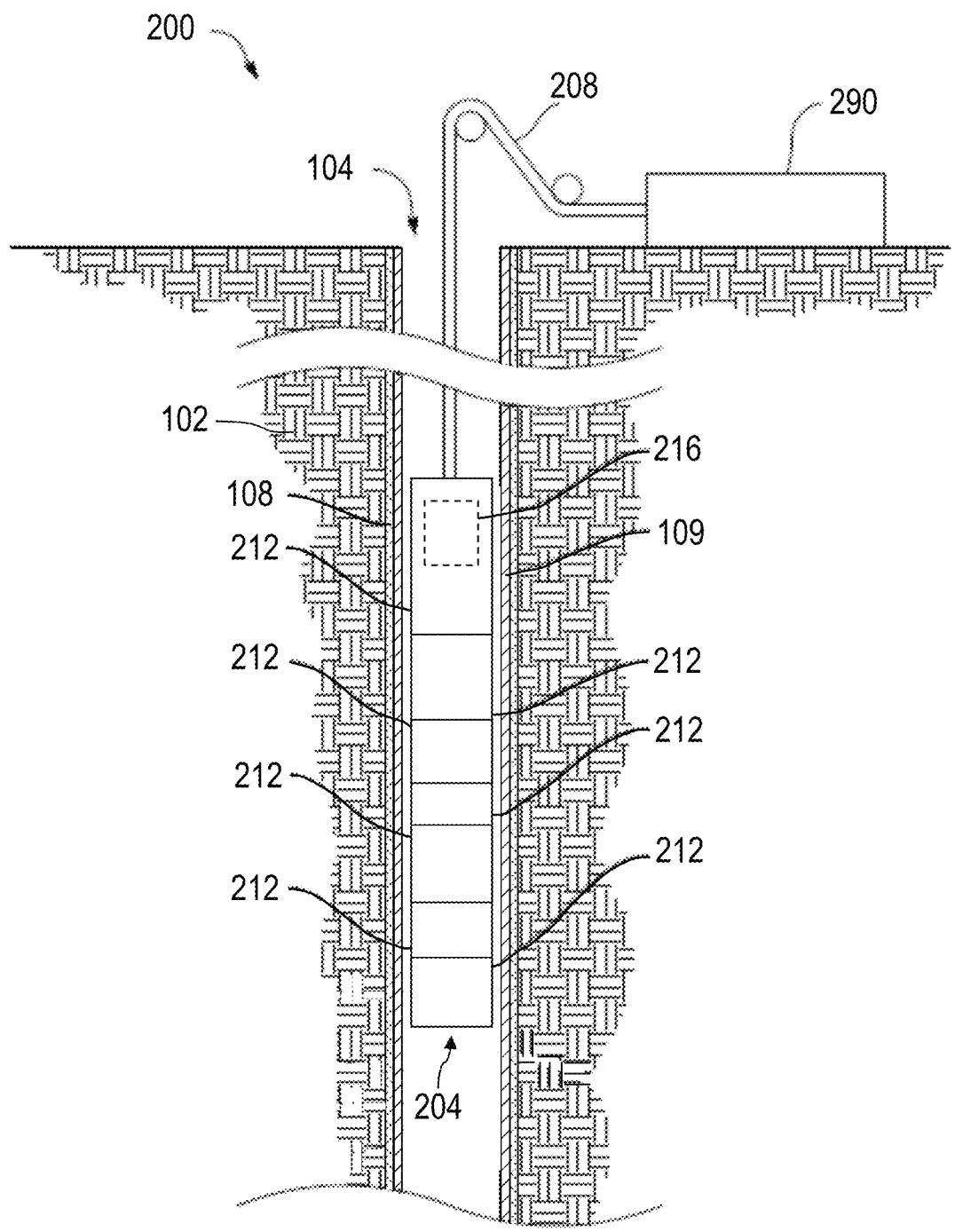
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the wellbore 104 via a wireline and/or other conveyance means 208. As with the wellsite system 100 shown in FIG. 1, the example wellsite system 200 of FIG. 2 may be utilized for evaluation of the wellbore 104, the cement 108 securing the casing 109 within the wellbore 104, and/or the formation 102 penetrated by the wellbore 104.

The tool string 204 is suspended in the wellbore 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Figure 3:
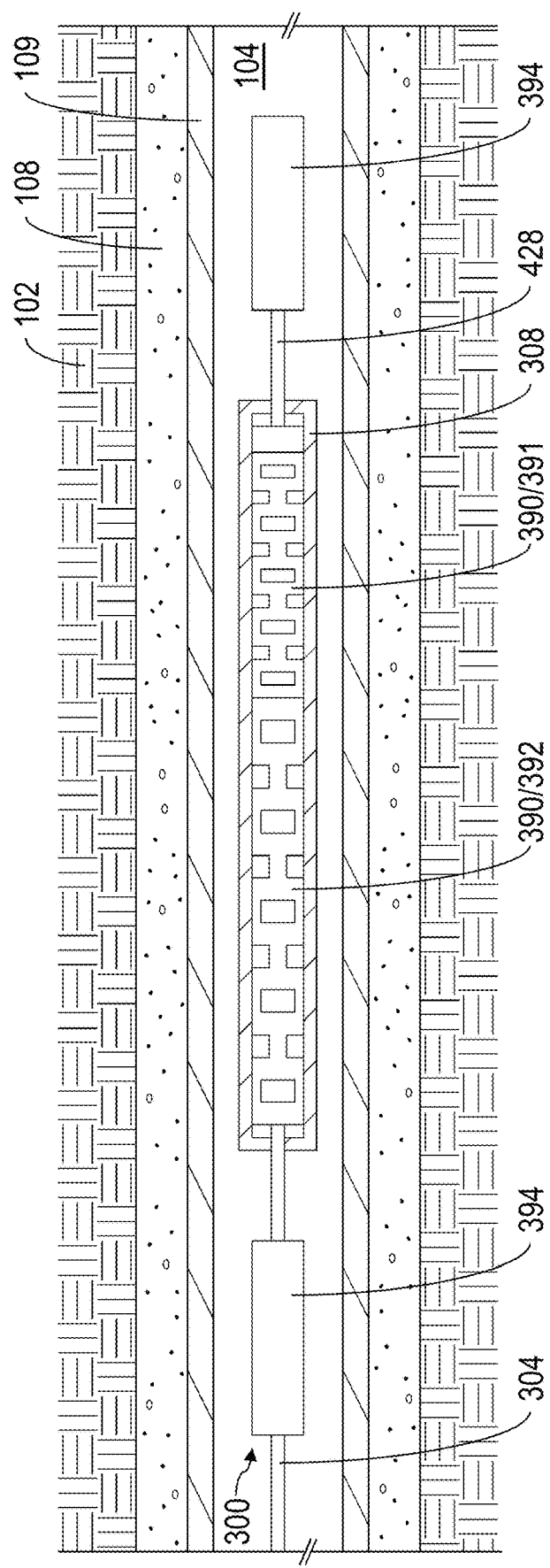
FIG. 3 is a schematic view of a portion of an example implementation of apparatus according to one or more aspects of the present disclosure.

FIG. 3 is a schematic sectional view of at least a portion of an example implementation of an acoustic tool 300 according to one or more aspects of the present disclosure. The acoustic tool 300 may be implemented as one or more of the LWD modules 144 shown in FIG. 1 and/or one or more of the modules 212 shown in FIG. 2, and may thus be conveyed within the wellbore 104 via drill string, wireline, and/or other conveyance means 304 schematically depicted in FIG. 3. The acoustic tool 300 may be utilized to evaluate the cement 108 securing the casing 109 within the wellbore 104, and/or to evaluate portions of the formation 102 surrounding the wellbore 104, according to one or more aspects of the present disclosure. In FIG. 3, the acoustic tool 300 is depicted as being disposed in a substantially horizontal portion of the wellbore 104. However, the acoustic tool 300 may also be utilized in other deviated or vertical portions of a wellbore.

The acoustic tool 300 includes a housing (or multiple housings) 308 and/or a hybrid slotted sleeve 390 encasing operational components described below. The acoustic tool 300 also includes cantilevered masses 394 extending from opposing ends of the housing 308.

Figure 4:
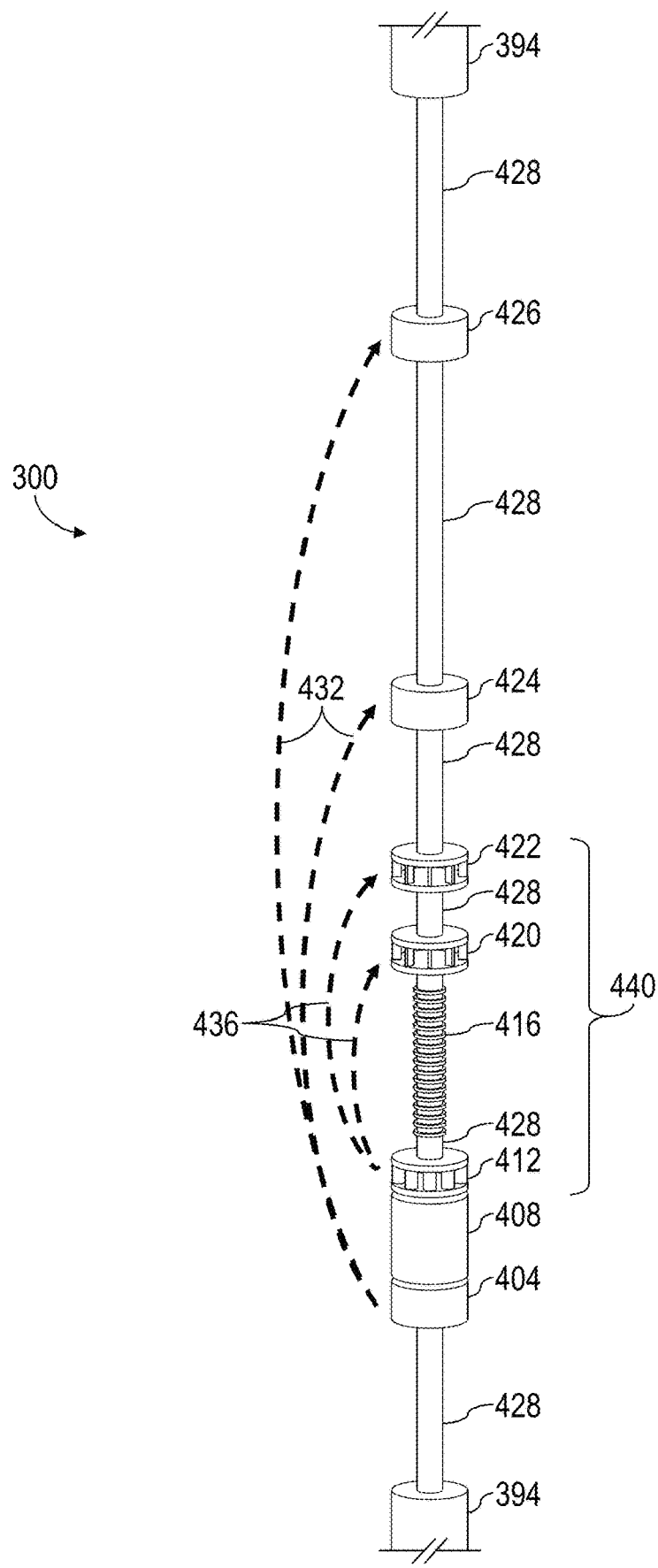
FIG. 4 is a schematic view of a portion of the apparatus shown in FIG. 3.

FIG. 4 is a perspective view of a portion of the acoustic tool 300 having been removed from the wellbore 104, and with the housing 308 and hybrid slotted sleeve 390 removed for clarity. In addition to the cantilevered masses 394 shown in FIG. 3, the acoustic tool 300 may also include one or more of a low-frequency transmitter unit 404, electronics 408, a high-frequency transmitter unit 412, a bellows attenuator 416, one or more high-frequency receiver units 420, 422, and one or more low-frequency receiver units 424, 426, as well as various structural members 428 interconnecting such components.

The electronics 408 may be, comprise, or form at least a portion of the downhole controller 150 shown in FIG. 1 or the downhole controller 216 shown in FIG. 2. The electronics 408 are operable to, for example, cause the transmitter units 404, 412 to emit acoustic signals 432, 436 and detect the acoustic signals 432, 436 with the corresponding receiver units 420, 422, 424, 426, such as for detecting the travel time of the acoustic signals 432, 436 between the transmitter units 404, 412 and the corresponding receiver units 420, 422, 424, 426, as well as amplitudes of the acoustic signals 432, 436 received at the receiver units 420, 422, 424, 426. To increase clarity and aid with understanding, additional features and components of the acoustic tool 300 not relevant to the following description are omitted in the figures, but it is understood that such features and components may exist in various implementations within the scope of the present disclosure. It is also noted that other implementations of an acoustic tool within the scope of the present disclosure may omit one or more of the components depicted in the figures.

Figure 5:
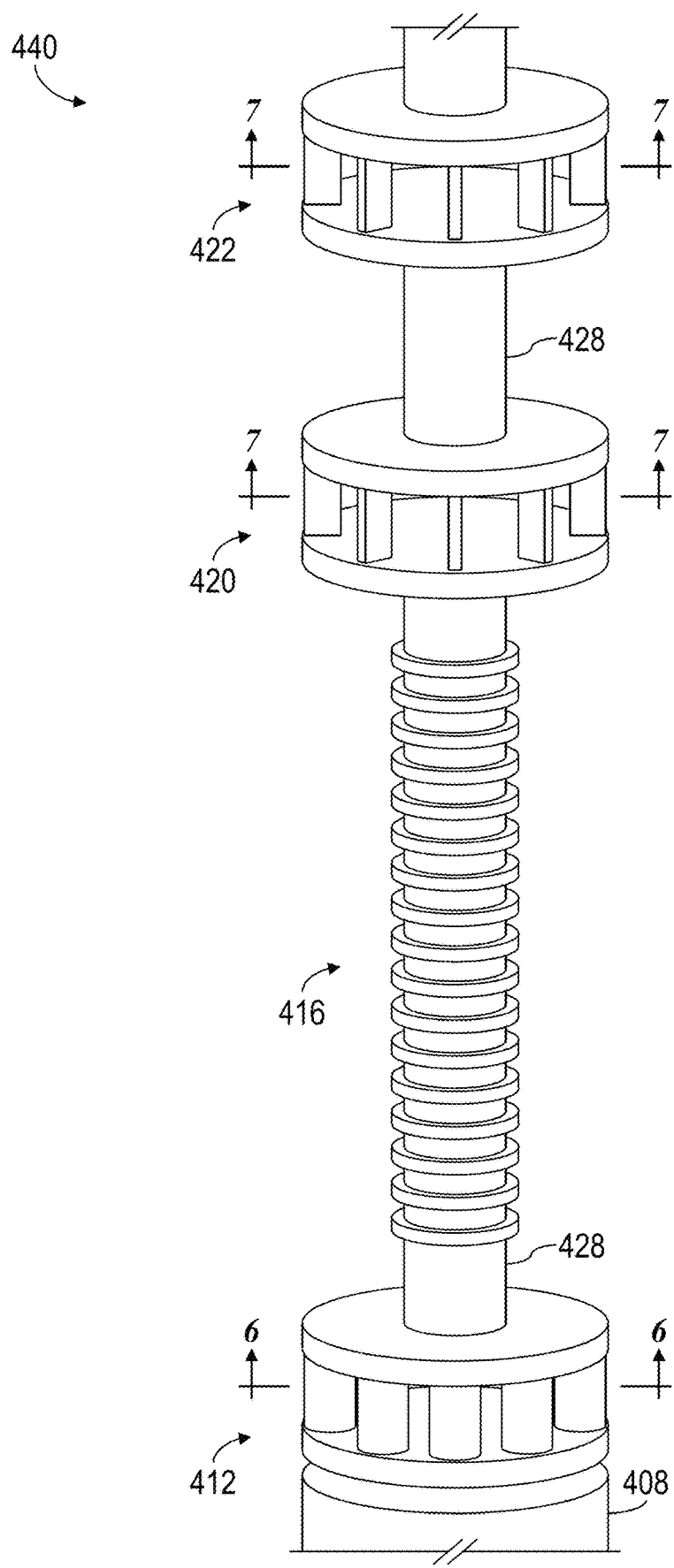
FIG. 5 is a schematic view of a portion of the apparatus shown in FIG. 4.

FIG. 5 is a perspective view of a mapping portion 440 of the acoustic tool 300 shown in FIG. 4. For example, the mapping portion 440 may comprise the high-frequency transmitter unit 412, the bellows attenuator 416, and one or more high-frequency receiver units 420, 422, as well as various structural members 428.

Figure 6:
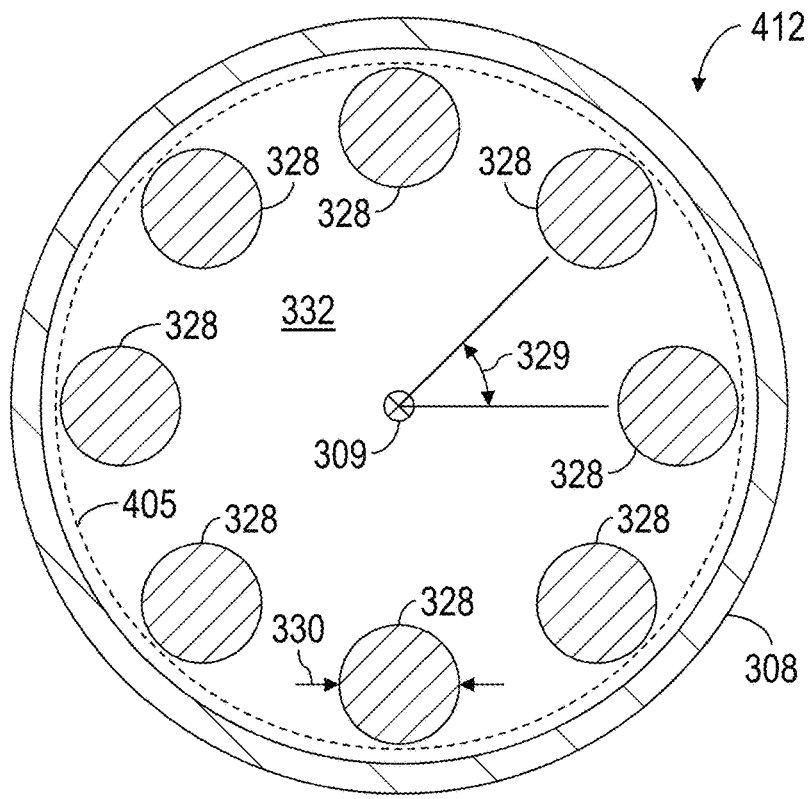
FIGS. 6 and 7 are sectional views of the apparatus shown in FIG. 5.

FIG. 6 is a sectional schematic view of at least a portion of an example implementation of the high-frequency transmitter unit 412. The example high-frequency transmitter unit 412 comprises eight transmitters 328 positionally fixed within the housing 308 via an attachment structure 332. The transmitters 328 are independently and/or collectively operable to excite acoustic energy to induce monopole, dipole, and other higher order azimuthal modes, depending on which transmitters 328 are excited simultaneously and their polarity, to generate acoustic signals 436 as depicted in FIG. 4. In addition, by exciting each transmitter 328 one-by-one, a unipole excitation may also be achieved. Each transmitter 328 may comprise a substantially cylindrical portion of piezoelectric material, such as PCT C-64, and and/or other materials permitting each transmitter 328 to by independently operated or activated as a point source. The frequency of the acoustic signals 436 generated by the transmitters 328 may vary within the scope of the present disclosure, such as between about 20 kHz and about 200 kHz, with an example implementation at a frequency of about 100 kHz.

The transmitters 328 are distributed azimuthally around a central axis 309 of the housing 308. The azimuthal spacing 329 between neighboring ones of the transmitters 328 may be about 45 degrees. Each transmitter 328 may have a diameter 330 ranging between about 1.5 centimeters (cm) and about 5 cm, and a length (extending into and out of the page) ranging between about 2.5 cm and about 10 cm. However, other numbers, spacings, and sizes of the transmitters 328 are also within the scope of the present disclosure.

The low-frequency transmitter unit 404 may be substantially similar to the high-frequency transmitter unit 412, but is depicted in FIG. 4 as a conventional monopole source. For example, such implementations may comprise a single transmitter, represented in FIG. 6 by a dashed-line circle 405 encompassing the array of smaller transmitters 328. Similarly, the low-frequency receivers 424, 426 may also be single element receivers, such as may be conventionally utilized with monopole sources. Implementations within the scope of the present disclosure may also comprise other types and arrangements of acoustic transmitters and receivers, whether instead of or in addition to the example implementations depicted in the figures.

Figure 7:
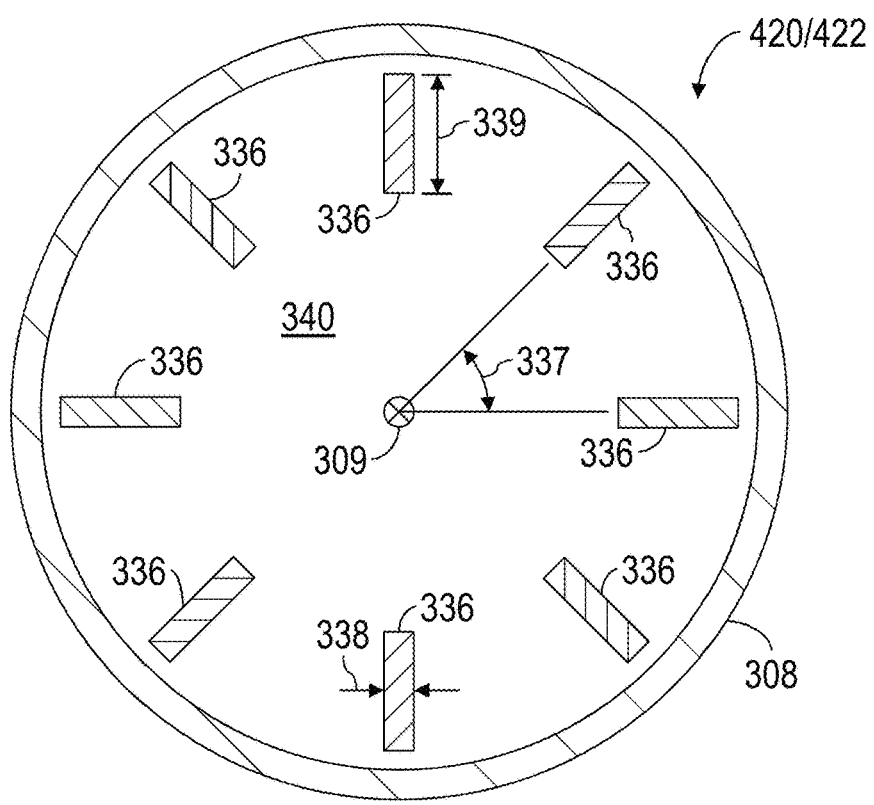

FIG. 7 is a sectional schematic view of at least a portion of an example implementation of the high-frequency receiver units 420, 422. The example high-frequency receiver units 420, 422 each comprise eight receivers 336 positionally fixed within the housing 308 via an attachment structure 340. The receivers 336 are each independently operable to detect acoustic energy excited by the high-frequency transmitter unit 412, whether transmitted as unipole, monopole, dipole, and other higher order azimuthal modes. Thus, the receivers 336 may be used for measuring amplitudes and travel times of the acoustic signals 436.

The receivers 336 are distributed azimuthally around the central axis 309 of the housing 308. The azimuthal spacing 337 between neighboring ones of the receivers 336 may be about 45 degrees, and each receiver 336 may be substantially aligned azimuthally with a corresponding one of the high-frequency transmitters 328, or the array of high-frequency receivers 336 may be azimuthally offset from the array of high-frequency transmitters 328, such as in implementations in which the array of high-frequency receivers 336 is rotated 20-25 degrees around the central axis 309 relative to the array of high-frequency transmitters 328. Each receiver 336 may have a width 338 ranging between about 0.5 cm and about 2 cm, a length 339 ranging between about 1.5 cm and about 5 cm, and a height (extending into and out of the page in FIG. 7) ranging between about 2.5 cm and about 10 cm. However, other numbers, spacings, sizes, and shapes of the receivers 336 are also within the scope of the present disclosure.

Each receiver 336 may comprise a substantially rectangular portion of piezoelectric material, such as PCT C-64, and and/or other materials permitting each receiver 336 to be independently operated or activated as an individual receiver at the operating frequencies described above with respect to the high-frequency transmitter unit 412. Implementations within the scope of the present disclosure may also comprise other types and arrangements of acoustic receivers, whether instead of or in addition to the example implementations depicted in the figures.

The present disclosure introduces one or more aspects related to using data from a receiver at the same azimuth as the firing transmitter, referred to herein as an axial path, as well as data from one or more receivers at different azimuths relative to the firing transmitter, referred to herein as an angle path. Employing both axial and angle paths, such as for azimuthal cement evaluation, can obtain azimuthally distributed measurements for amplitude, attenuation, and/or transit time with a relatively small number of transmitters. The multiple data points on the same azimuth can be also used for quality control and further enhancement of the cement bond image. In addition, the usage of both axial and angle paths can be also useful for open-hole applications, such as if formation properties are different in azimuth, such as anisotropy and azimuthal heterogeneity. One or more aspects of the present disclosure may also be more effective for relatively high-frequency (e.g., 100 kHz) sonic measurements in which spatial resolution is higher than that of conventional sonic logging (e.g., less than about 30 kHz), so that angle path signals can provide distinguishable information in different azimuths, relative to just axial path operations.

Conventional cement mapping tools with a monopole source and multiple azimuthal receivers that operate at low frequencies (e.g., less than about 30 kHz) can be limited by the lack of an azimuthal receiver array, such that there is just one station in the axial direction, and by the inability to address attenuation, as well as the sonic frequency not being as effective at higher frequencies (e.g., 100 kHz). Other conventional cement mapping tools with pad-mounted azimuthal sources and receivers can be limited by the axial path not being addressed due to a limited number of receivers, as well as tool dimensions. Other conventional cement mapping tools with sectored transmitters and receivers that operate at high frequencies (e.g., about 100 kHz) can be limited by the lack of an azimuthal array, such that there is just one station in the axial direction, and by the inability to address attenuation.

Conventional LWD open hole unipole measurements can be limited by the lack of an azimuthal array, such that just one receiver is at the same azimuth of the unipole source, and by the sonic frequency not being as effective at higher frequencies (e.g., about 100 kHz). Other conventional open-hole tools can be limited in that dipole measurements can provide formation anisotropy, such as intrinsic and/or stress-induced, but not azimuthal heterogeneity in the wellbore. Other conventional open-hole tools can also be limited in that the sonic frequency is not as effective at higher frequencies (e.g., about 100 kHz) for azimuthal amplitude analysis.

The present disclosure introduces using both axial and angle paths with azimuthally distributed receivers, perhaps including with a unipole source. Such implementations may utilize high-frequency sonic measurements, such as about 100 kHz.

One or more aspects of the present disclosure relate to obtaining coverage of a wide range of azimuthal measurements with relatively small number of transmitters for radial cement bond evaluation. For example, for eight azimuthally sectored measurements, eight transmitters may be utilized to cover the azimuthal range if using just axial paths. However, by using angle paths according to one or more aspects of the present disclosure, coverage of the same azimuthal range may be obtained utilizing just four transmitters. One or more aspects of the present disclosure also relate to enhancement of image, quality control, and robust measurements by utilizing multiple data on the same azimuth point for radial cement bond evaluation. One or more aspects of the present disclosure also relate to applicability for open-hole formation evaluations, such as intrinsic/stress anisotropies, azimuthal heterogeneity, and others.

Figure 8:
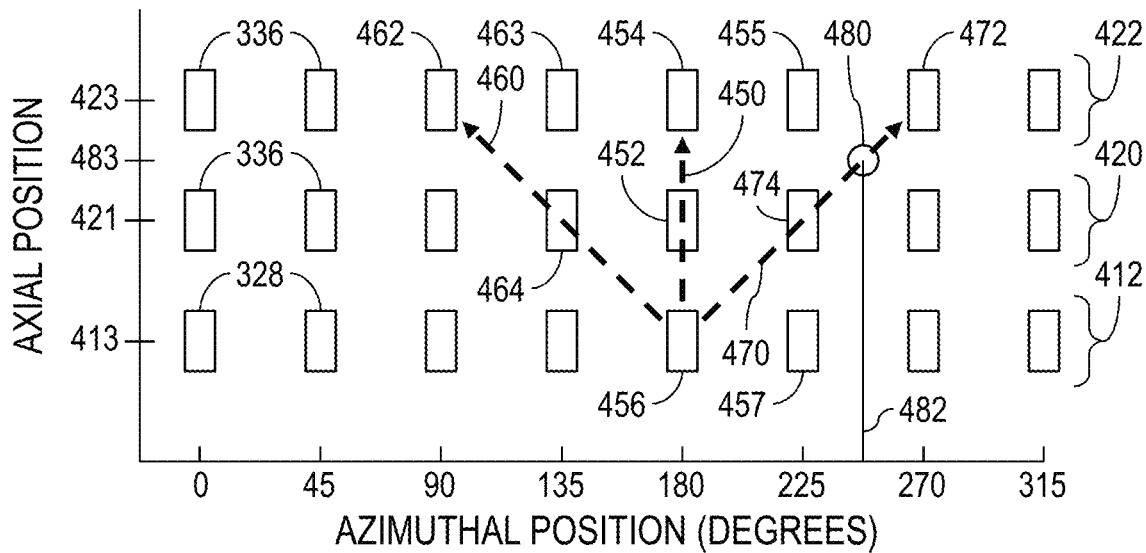
FIG. 8 is a schematic view of a portion of an example implementation of apparatus according to one or more aspects of the present disclosure.

FIG. 8 is a schematic view of an example implementation of the acoustic tool 300 described above, including multiple azimuthal sources and receiver arrays for azimuthal measurements of sonic/ultrasonic pitch catch according to one or more aspects of the present disclosure. The transmitters 328 of the transmitter unit 412 are positioned at an axial position 413, the receivers 336 of the receiver unit 420 are positioned at an axial position 421, and the receivers 336 of the receiver unit 422 are positioned at an axial position 423. When each transmitter 328 is fired independently, it is referred to as unipole measurement. Based on such measurement, one of the transmitters 328 at a side of the casing/formation tends to focus energy on that side of casing/formation. The signal from the casing/formation back to the receivers 336 located at the same side can be used for evaluation of that azimuthal direction.

FIG. 8 depicts a measurement with an axial path 450 in which a receiver 336 of the receiver unit 420 (designated in FIG. 8 by reference number 452) and a receiver 336 of the receiver unit 422 (designated in FIG. 8 by reference number 454) are located at the same azimuth (180 degrees) as the transmitter 328 that is firing (designated in FIG. 8 by reference number 456). With this method, other transmitters 328 in different azimuths are utilized to cover different azimuthal measurement points, unless the acoustic tool 300 is rotated. On the other hand, when multiple, azimuthally-distributed receivers 336 are available, there is additional data available from the multiple receivers while still firing just one of the transmitters 328.

For example, FIG. 8 also depicts an angle path 460 extending from the firing transmitter 456 to a receiver 336 of the receiver unit 422 (designated in FIG. 8 by reference number 462) at an azimuthal position of 90 degrees, thus azimuthally offset from the firing transmitter 456 by 90 degrees. The angle path 460 also extends through a receiver 336 of the receiver unit 420 (designated in FIG. 8 by reference number 464) at an azimuthal position of 135 degrees, thus azimuthally offset from the firing transmitter 456 by 45 degrees. Another angle path 470 similarly extends from the firing transmitter 456 to a receiver 336 of the receiver unit 422 (designated in FIG. 8 by reference number 472) at an azimuthal position of 270 degrees, including through a receiver 336 of the receiver unit 420 (designated in FIG. 8 by reference number 474) at an azimuthal position of 225 degrees. With this method, different azimuthal measurement points can be covered without actual transmitter allocation. Moreover, measurements can also be obtained (or deduced) at azimuthal locations between the azimuthal positions of the receivers 336. For example, this is depicted in FIG. 8 by a measurement 480 at an azimuthal position 482 and axial position 483 interposing the receivers 472, 474.

Figure 9:
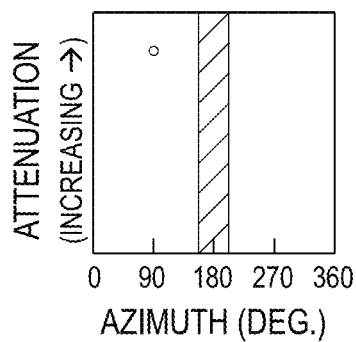
FIGS. 9-14 are graphs each depicting one or more aspects related to the present disclosure.
Figure 10:
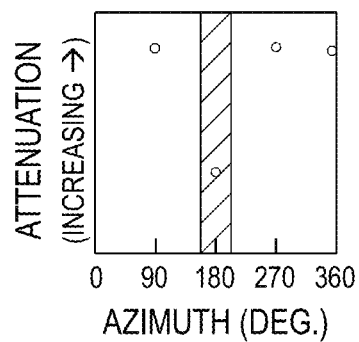
Figure 11:
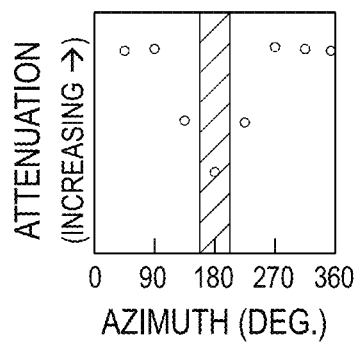
Figure 12:
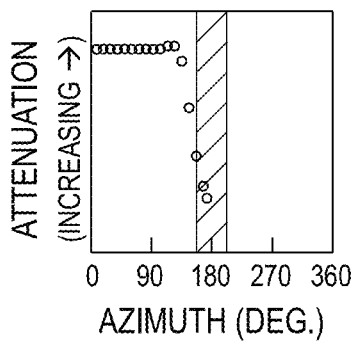
Figure 13:
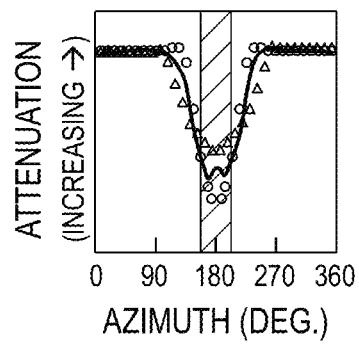
Figure 14:
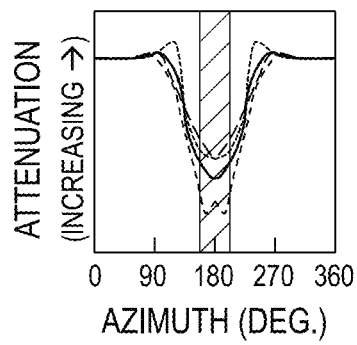

FIGS. 9-14 are graphs depicting an example application of the axial and angle paths for azimuthal cement bond evaluation by using attenuations of casing extensional mode. FIGS. 9-11 represent attenuation of casing extensional mode with just axial paths, and not angle paths, while FIGS. 12-14 represent attenuation of casing extensional mode with axial and angle paths. The stripe centered at 180 degrees represents the presence of a cement channel in that particular azimuth. FIGS. 9 and 12 are the case of firing just one transmitter 328. In such case, for receivers 336 that are not azimuthally aligned along the axial path with the transmitter 328, interpolation of detected casing amplitudes in locations azimuthally between the receivers 336 is applied to calculate attenuation. Employing both axial and angle paths can extend the measurement points to cover a wide range in azimuth, and permits measurements to cover the full azimuthal range with a relatively small number of transmitters, as shown in FIG. 13 depicting an example implementation firing four transmitters 328, and as shown in FIG. 14 depicting an example implementation firing eight transmitters 328.

In addition, there can be multiple data at the same azimuth with different path directions, such as the opposing angle paths 460 and 470 shown in FIG. 8, by considering the number of transmitters and path angles. The multiple data points on the same azimuth can be used for ensuring quality control of the cement bond evaluation, compensation of missing points when transmitters and/or receivers fails, and further enhancement of the image itself. For example, FIGS. 13 and 14 each include a solid line depicting an average of the measurements at each azimuthal location.

FIGS. 9-14 illustrate that a lower number of transmitters 328 can be utilized with angle paths and achieve the same result as with more transmitters utilizing just axial paths. Such implementations may also permit additional data being available for robust interpolation and quality assurance.

Figure 15:
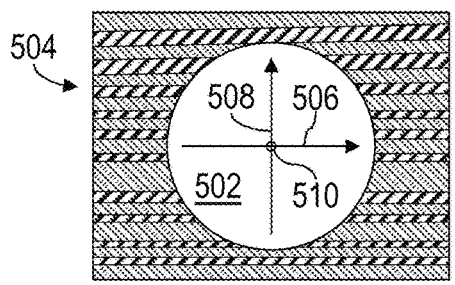
FIG. 15 is a schematic view of a portion of an example subterranean formation pertaining to one or more aspects of the present disclosure.
Figure 16:
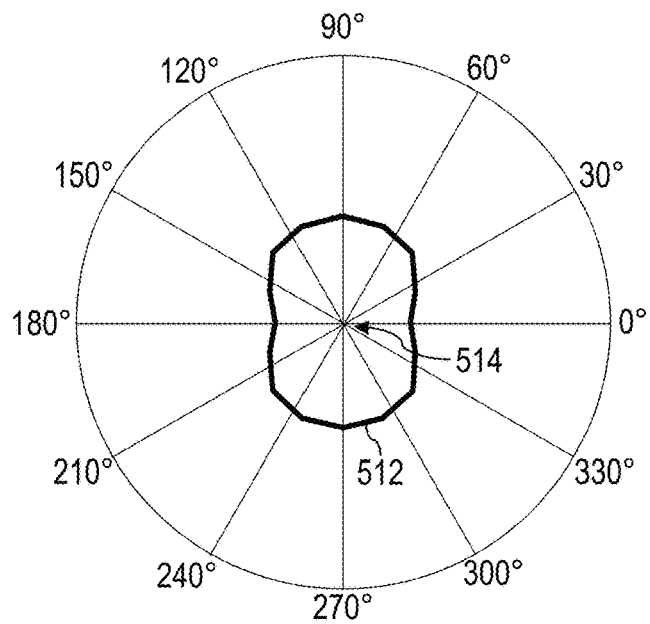
FIG. 16 is a graph depicting one or more aspects of the formation shown in FIG. 15.
Figure 17:
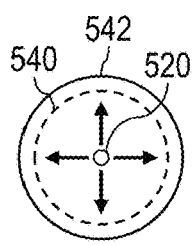
FIGS. 17-21 are schematic views depicting example excitations within the scope of the present disclosure.
Figure 18:
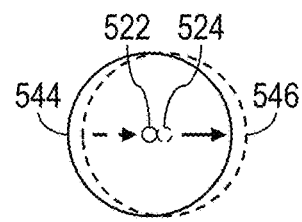
Figure 19:
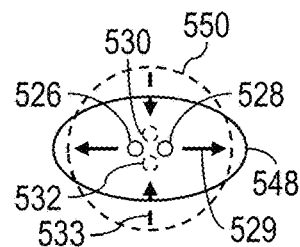
Figure 20:
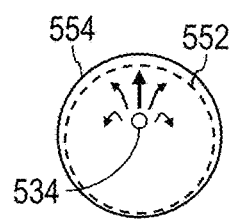
Figure 21:
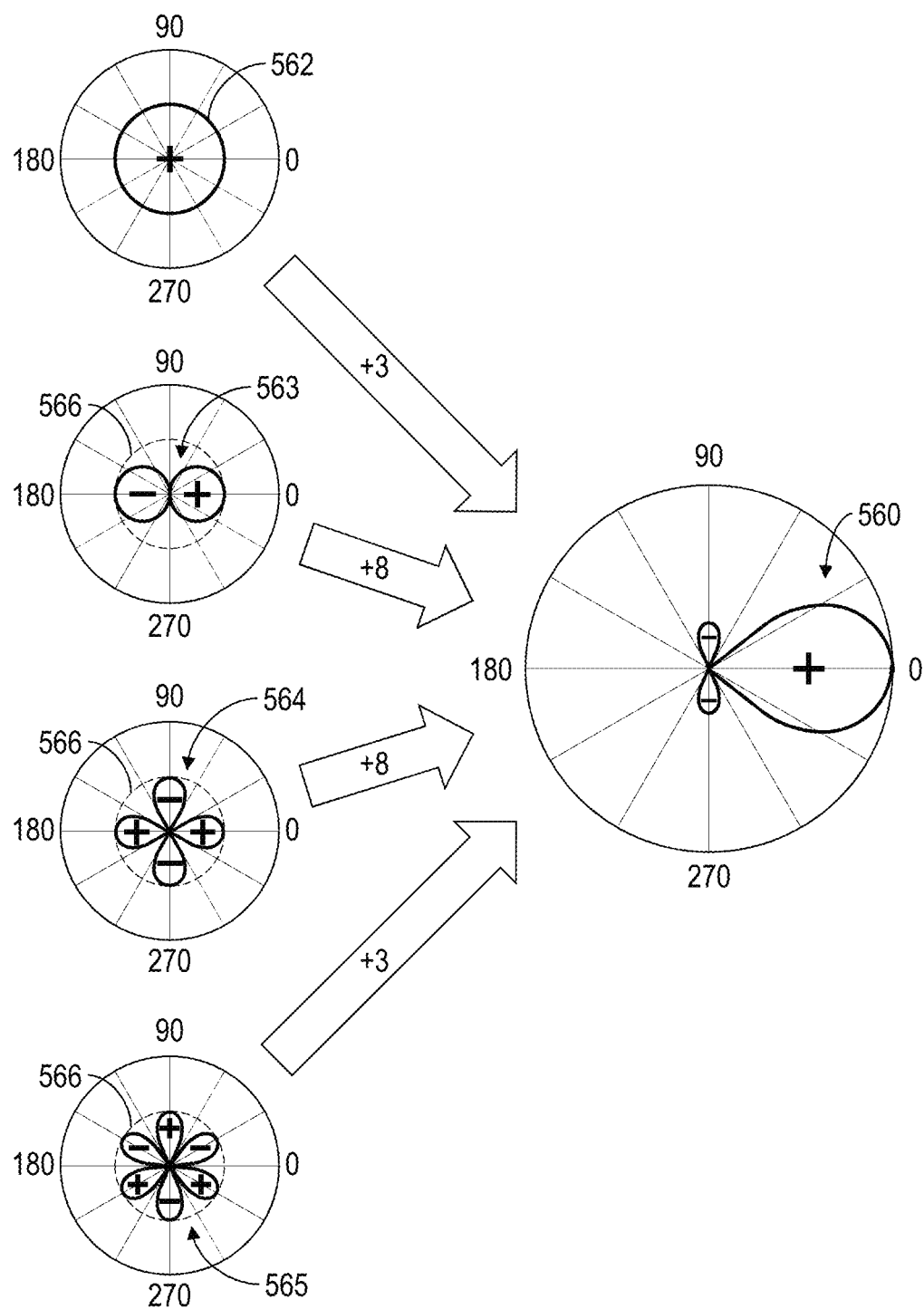

The usage of the angle paths may also be utilized for open-hole unipole measurements, such as when there are azimuthal differences in formation properties. For example, FIG. 15 depicts a horizontal portion 502 of a wellbore (such as the wellbore 104 shown in FIGS. 1-3) extending through a vertical transverse isotropy (VTI) portion 504 of a formation (such as the formation 102 shown in FIGS. 1-3). An arrow 506 indicates the direction perpendicular to both gravity and the central axis 510 of the wellbore portion 502, and an arrow 508 indicates the direction towards the wellsite surface (i.e., opposite the direction of gravity). FIG. 16 depicts example non-uniform relative amplitude distributions 512 of formation compressional wave in the example implementation of FIG. 15, as assessed by unipole firing using just axial path measurements. The zero-degree and ninety-degree azimuth positions in FIG. 16 respectively correspond to the directions 506 and 508 depicted in FIG. 15, and the radial direction represents relative amplitude distributions increasing from zero at the graph center 514. As shown in FIG. 16, the relative amplitude distributions 512 of formation compressional wave are larger above and below the wellbore 502, and smaller to the sides of the wellbore 502. Thus, the use of angle paths in addition to just axial paths may provide more and/or more accurate information in the example implementation depicted in FIGS. 15 and 16 and other open-hole implementations. Moreover, not just amplitude but also other attributes measured by axial and angle paths may be utilized to characterize the azimuthal differences of formation properties according to one or more aspects of the present disclosure.

As described above, the measurement frequency range of conventional sonic logging tools is below 30 kHz, both for evaluating formation elastic properties in open-hole implementations and for evaluating cement bond quality in cased-hole implementations. This frequency range can limit the spatial resolution with which the sonic logging tool can provide formation elastic properties and cement bonding quality. For example, the wavelength of compressional waves propagating through typical fast rocks (e.g., a compressional wave travel time DTc of about 200 μs/m) is approximately 15 cm with a frequency of 30 kHz. If the target media (formation or casing cement) exhibits heterogeneity of similar or shorter wavelength, the sonic logging provides averaged information over the corresponding wavelength. Thus, apparatus according to one or more aspects introduced in the present disclosure may be operated in a manner utilizing a lower measurement frequency (e.g., about 30 kHz or less) for reading information deep inside formations or wide around cemented casings, and utilizing a higher measurement frequency (e.g., about 50 kHz or more) for probing the target media with finer special resolution.

FIGS. 17-21 are schematic views of example excitations that may be induced by the acoustic tool 300 depicted in FIGS. 3-7 and other implementations within the scope of the present disclosure. As described above, the signals 436 induced by the transmitters 328 can be measured by the receivers 336 to process monopole, dipole, and other higher order azimuthal modes, as well as unipole, at each azimuthal position of the transmitters and receivers. In the monopole example depicted in FIG. 17, sound pressure varies uniformly (relative to azimuth) between a minimum 540 and a maximum 542 uniformly around the source 520. In the dipole example depicted in FIG. 18, sound pressure varies between a first extreme 544 corresponding to a first source 522 and a second extreme 546 corresponding to a second source 524. In the lateral quadrupole example depicted in FIG. 19, sound pressure varies between a first extreme 548 corresponding to a first pair of sources 526, 528 and a second extreme 550 corresponding to a second pair of sources 530, 532, wherein the axis 529 of the first sources 526, 528 is substantially perpendicular to the axis 533 of the second sources 530, 532. In the unipole example depicted in FIG. 20, sound pressure varies between a minimum 552 and a maximum 554 in an azimuthally non-uniform ("directed") manner relative to the source 534.

Unipole excitation can be also built by algebraic composition of multipole excitations. For example, the unipole implementation 560 schematically depicted in FIG. 21 may be algebraically composed by three monopoles 562, eight dipoles 563, eight lateral quadrupoles 564, and three hexapoles 565, with each algebraic constituent 562-565 having the same maximum pressure level 566.

Figure 22:
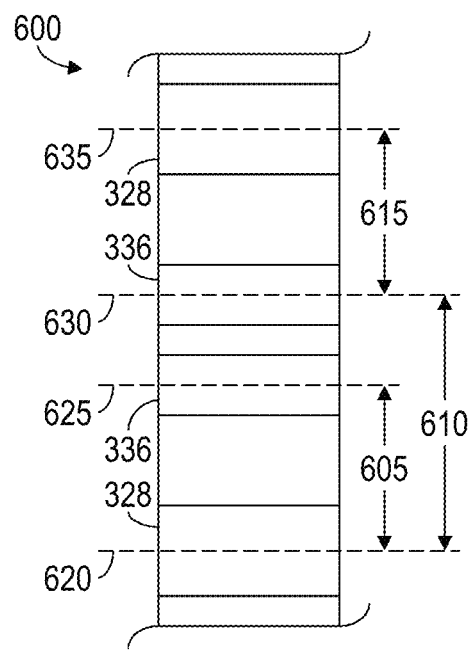
FIG. 22 is a schematic view of at least a portion of an example implementation of apparatus according to one or more aspects of the present disclosure.

FIG. 22 is a schematic view of at least a portion of another implementation of the acoustic tool 300 depicted in FIGS. 3-7, designated in FIG. 22 by reference number 600, in which arrays of azimuthally distributed transmitters 328 are located on opposing sides of the arrays of receivers 336. Such implementations, as well as others within the scope of the present disclosure, may be utilized for achieving compensated measurements in open- and/or cased-hole implementations to evaluate formation elastic properties and/or cement bond quality behind one or more casings.

In open-hole logging according to one or more aspects of the present disclosure, refracted waves and borehole modes may be measured with monopole, dipole, and other higher order azimuthal modes at relatively high frequency (e.g., about 100 kHz). Refracted waves and borehole modes may additionally be measured via unipole (or synthesized unipole) at each source and receiver azimuthal position at the same frequency. The position of the acoustic tool 300/600 relative to the central axis of the wellbore and/or wellbore diameter may also be measured with high-frequency unipole measurements. The high-frequency measurements with shorter transmitter-to-receiver (TR) spacing may also permit finer spatial resolution of elastic properties, such as heterogeneity and/or other properties that may not be seen in the sonic/seismic range.

In cased-hole logging according to one or more aspects of the present disclosure, the axially separated arrays of receivers 336 may also be used for estimating casing arrival arrivals across the receiver arrays. The measured amplitudes, attenuations, and/or transit times at each different azimuth may also be utilized to map the azimuthal heterogeneity of cement bond condition.

Figure 23:
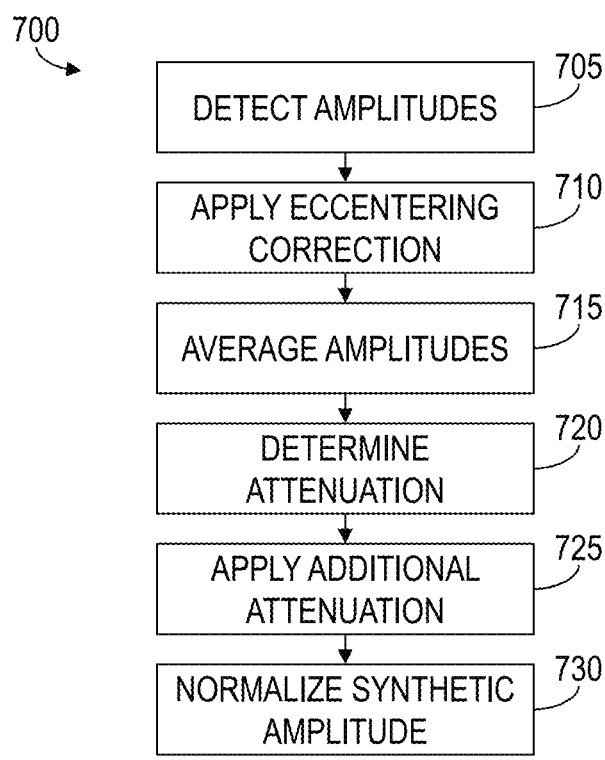
FIG. 23 is a flow-chart diagram of at least a portion of an example implementation of a method according to one or more aspects of the present disclosure.

Synthetized CBL may also be constructed with the azimuthally averaged amplitudes and attenuation data. By knowing the tool position relative to the center axis of the casing, the eccentering effect can be corrected prior to averaging amplitudes and attenuation. For example, FIG. 23 is a flow-chart diagram of at least a portion of an example implementation of a method (700) for synthesized CBL utilizing an implementation of the acoustic tool 300 depicted in FIGS. 3-7, the acoustic tool 600 depicted in FIG. 22, and/or other implementations also within the scope of the present disclosure.

The method (700) includes detecting (705) amplitudes for multiple (e.g., eight) azimuthal sectors and two or more axial regions or sections defined by radial planes each extending through one or more transmitters 328 and/or receivers 336. For example, considering the implementation depicted in FIG. 22, one axial region 605 may extend from a radial plane 620 of the lower array of transmitters 328 to a radial plane 625 of the lower array of receivers 336, and another axial region 610 may extend from the radial plane 620 of the lower array of transmitters 328 to a radial plane 630 of the upper array of receivers 336. The analyzed axial sections may or may not overlap. For example, another analyzed axial section 615 may extend from a radial plane 635 of the upper array of transmitters 328 to the radial plane 630 of the upper array of receivers 336. The amplitude detection (705) in one or more of the axial regions 605, 610, 615 may utilize axial and/or angle path data as described above.

The eccentering correction for amplitude is then applied (710) based on delta travel times and eccentering. The multiple (e.g., eight) amplitudes in azimuth are then averaged (715) for each axial section, and the attenuation rate (dB/cm) for each axial section is determined (720) using the averaged (715) amplitudes. With the calculated attenuation rate, additional attenuation is applied (725) to amplitude data for synthetic transmitter-to-receiver spacing (e.g., 0.6 meters (m) additional path for an axial section length of about 0.3 m). The synthetic amplitude is then normalized (730) at a depth close to free pipe.

FIG. 24 is a flow-chart diagram of at least a portion of another example implementation of a method (750) utilizing an implementation of the acoustic tool 300 depicted in FIGS. 3-8, the acoustic tool 600 depicted in FIG. 22, and/or other implementations also within the scope of the present disclosure. For the sake of clarity, however, the method (750) is described below in the context of the example implementation depicted in FIG. 8. One or more aspects of the method (750) depicted in FIG. 24 may be utilized in combination with one or more aspects of the method (700) depicted in FIG. 23 and/or other methods within the scope of the present disclosure.

The method (750) comprises transmitting (755) an acoustic signal from the transmitter 456 and sensing (760) an attribute of the acoustic signal with each of a plurality of receivers 420, 422. The receivers 336 that sense (760) the acoustic signal attribute include a first receiver 452 axially offset from and azimuthally aligned with the transmitter 456, a second receiver 454 axially offset from and azimuthally aligned with the transmitter 456 and the first receiver 452, a third receiver 464 (or 474) axially and azimuthally offset from the transmitter 456, and a fourth receiver 462 (or 472) axially and azimuthally offset from the transmitter 456, the first receiver 452, and the third receiver 464.

For example, as depicted in FIG. 8: the third receiver 464 may be azimuthally offset from the transmitter 456, the first receiver 452, and the second receiver 454 by about 45 degrees; the fourth receiver 462 may be azimuthally offset from the transmitter 456, the first receiver 452, and the second receiver 454 by about 90 degrees; and the fourth receiver 462 may be azimuthally offset from the third receiver 464 by about 45 degrees. Thus, the first receiver 452 and the second receiver 454 may be substantially aligned with a first acoustic path 450 of the acoustic signal that extends along a substantially axial path along the downhole tool between the transmitter 456 and the second receiver 454, whereas the third receiver 464 and the fourth receiver 462 may be substantially aligned with a second acoustic path 460 of the acoustic signal that extends along a substantially non-axial, angle path along the downhole tool between the transmitter 456 and the fourth receiver 462.

The method (750) may further comprise evaluating (765) a characteristic of cement 108 substantially surrounding casing 109 within the wellbore 104. Such evaluation (765) utilizes the acoustic signal attribute sensed (760) by each of the first receiver 452, the second receiver 454, the third receiver 464, and the fourth receiver 462. For example, the cement characteristic may be bonding quality between the cement 108 and the casing 109. In such implementations, the acoustic signal attribute may be amplitude, attenuation, and/or transit time.

The method (750) may also or instead comprise evaluating (770) a characteristic of a subterranean formation 102 into which the wellbore 104 extends. Such evaluation (770) utilizes the acoustic signal attribute sensed (760) by each of the first receiver 452, the second receiver 454, the third receiver 464, and the fourth receiver 462. For example, the formation characteristic may exhibit azimuthal heterogeneity, such as when the formation characteristic is mechanical stress. In such implementations, the acoustic signal attribute may be amplitude.

FIG. 25 is a flow-chart diagram of at least a portion of another example implementation of a method (800) utilizing an implementation of the acoustic tool 300 depicted in FIGS. 3-8, the acoustic tool 600 depicted in FIG. 22, and/or other implementations also within the scope of the present disclosure. For the sake of clarity, however, the method (800) is described below in the context of the example implementation depicted in FIG. 8. One or more aspects of the method (800) depicted in FIG. 25 may be utilized in combination with one or more aspects of the method (700) depicted in FIG. 23, the method (750) depicted in FIG. 24, and/or other methods within the scope of the present disclosure.

The method (800) comprises conveying (805) the downhole tool 300, 600 within the wellbore 104. The downhole tool 300, 600 comprises a transmitter array 412 comprising a plurality of transmitters 328, 456 azimuthally distributed around a longitudinal axis of the downhole tool at a first axial location 413 of the downhole tool. The downhole tool 300, 600 also comprises a first receiver array 420 comprising a plurality of first receivers 336, 452, 464, 474 azimuthally distributed around the longitudinal axis at a second axial location 421 axially offset from the first axial location 413. The downhole tool 300, 600 also comprises a second receiver array 422 comprising a plurality of second receivers 336, 454, 462, 472 azimuthally distributed around the longitudinal axis at a third axial location 423 axially offset from the first and second axial locations 413, 421.

The method (800) also comprises transmitting (810) a first acoustic signal from a first one of the transmitters 412, such as the transmitter 456. The method (800) also comprises sensing (815) an attribute of the first acoustic signal with at least first and second ones of the first receivers 420, such as the receivers 452 and 464, and at least first and second ones of the second receivers 422, such as the receivers 454 and 462. A characteristic of a first region is then evaluated (820) based on first signals generated by the first receivers 452, 464 and the second receivers 454, 462, wherein the first signals are each indicative of the sensed (815) attribute of the first acoustic signal.

The method (800) also comprises transmitting (825) a second acoustic signal from a second one of the transmitters 412, such as designated in FIG. 8 by reference number 457. The attribute (that was previously sensed (815) from the first acoustic signal) of the second acoustic signal is then sensed (830) with at least third and fourth ones of the first receivers 420, such as the receivers 452 and 474, and at least third and fourth ones of the second receivers 422, such as the receivers designated in FIG. 8 by reference numbers 455 and 463. A characteristic of a second region (perhaps the same characteristic as previously evaluated (820) for the first region) is then evaluated (835) based on second signals generated by the first receivers 452, 474 and the second receivers 455, 463, wherein the second signals are each indicative of the sensed (830) attribute of the second acoustic signal.

The first evaluated (820) region and the second evaluated (835) region may each be regions of cement 108 substantially surrounding casing 109 within the wellbore 104 or regions of the subterranean formation 102 into which the wellbore 104 extends. Each region may extend azimuthally through a portion of the circumference of the wellbore 104, such that iterations 840 of the method (800) may collectively evaluate fully around 360 degrees.

FIG. 26 is a flow-chart diagram of at least a portion of another example implementation of a method (850) utilizing an implementation of the acoustic tool 300 depicted in FIGS. 3-8, the acoustic tool 600 depicted in FIG. 22, and/or other implementations also within the scope of the present disclosure. For the sake of clarity, however, the method (850) is described below in the context of the example implementation depicted in FIG. 8. One or more aspects of the method (850) depicted in FIG. 26 may be utilized in combination with one or more aspects of the method (700) depicted in FIG. 23, the method (750) depicted in FIG. 24, the method (800) depicted in FIG. 25, and/or other methods within the scope of the present disclosure.

The method (850) comprises conveying (855) a downhole tool 300, 600 within a wellbore 104, wherein the downhole tool comprises a transmitter array comprising a plurality of transmitters azimuthally spaced around a longitudinal axis of the downhole tool at a first axial location of the downhole tool, a first receiver array comprising a plurality of first receivers azimuthally spaced around the longitudinal axis at a second axial location axially offset from the first axial location, and a second receiver array comprising a plurality of second receivers azimuthally spaced around the longitudinal axis at a third axial location axially offset from the first and second axial locations. For example, the downhole tool 300, 600 may comprise: the transmitter array 412 comprising transmitters 328, 456, 457 azimuthally spaced around the longitudinal axis 309 at the axial location 413; the receiver array 420 comprising receivers 336, 452, 464, 474 azimuthally spaced around the longitudinal axis 309 at the axial location 421; and the receiver array 422 comprising receivers 336, 454, 455, 462, 463, 472 azimuthally spaced around the longitudinal axis 309 at the axial location 423.

An acoustic signal is transmitted (860) from an individual one 456 of the transmitters, and an attribute of the acoustic signal is sensed (865) with at least two individual ones 336, 452, 464, 474 of the first receiver array 420 and at least two individual ones 336, 454, 455, 462, 463, 472 of the second receiver array 422. For example, the at least two individual ones of the receivers may include the first receiver 452 azimuthally aligned with the individual transmitter 456, a first receiver 464 and/or 474 azimuthally offset from the individual transmitter 456, the second receiver 454 azimuthally aligned with the individual transmitter 456, and a second receiver 455, 462, 463, and/or 472 azimuthally offset from the individual transmitter 456. In one such implementation, the at least two individual ones of the receivers include: the first receiver 452 azimuthally aligned with the individual transmitter 456; the first receiver 474 azimuthally offset from the transmitter 456 in a first direction (e.g., azimuthally positive); the first receiver 464 azimuthally offset from the transmitter 456 in a second direction opposite the first direction (e.g., azimuthally negative); the second receiver 454 azimuthally aligned with the transmitter 456; the second receiver 472 azimuthally offset from the transmitter 456 in the first direction; and the second receiver 462 azimuthally offset from the transmitter 456 in the second direction. However, these are examples, and other implementations are also within the scope of the present disclosure.

A characteristic of a portion of a downhole feature is then evaluated (870) based on response signals generated by each of the individual ones of the first and second receivers. The downhole feature may be cement 108 substantially surrounding a casing 109 within the wellbore 104, such as in implementations in which the evaluated (870) characteristic is bonding quality between the cement 108 and the casing 109. The downhole feature may also or instead be a subterranean formation 102 penetrated by the wellbore 104, such as in implementations in which the evaluated (870) characteristic is mechanical stress and/or other parameter(s) of the formation 102. Each response signal of the sensing (865) receivers contains or is otherwise indicative of the acoustic signal attribute sensed (865) by the individual ones of the receivers.

The downhole feature portion may azimuthally correspond to two of the individual ones of the sensing (865) receivers having the greatest relative azimuthal offset. For example, if the sensing (865) receivers include the first receivers 452, 464, 474 and the second receivers 454, 455, 462, 463, 472, then the downhole feature portion may azimuthally correspond to the second receivers 462 and 472, which have a greater relative azimuthal offset than the other sensing (865) receivers. In such example, the downhole feature portion may extend between azimuthal positions of about 90 degrees and about 270 degrees, being centered at an azimuthal position of about 180 degrees.

The transmitting (860), sensing (865), and evaluating (870) are then repeated (875) with different individual ones of the transmitters and corresponding first and second receivers until the evaluated portions of the downhole feature collectively extend through about 360 degrees around the longitudinal axis. Thus, continuing with the present example, the repeat (875) may evaluate (870) another portion of the downhole feature centered at an azimuthal position of about 0/360 degrees and extending between azimuthal positions of about 270 degrees and about 90 degrees. By repeating (875) until the evaluated (870) portions of the downhole feature collectively extend through about 360 degrees, the full azimuthal range of the downhole feature can be evaluated (870) without rotating the downhole tool 300, 600 within the wellbore 104. Thus, the method (850) may intentionally exclude physically rotating the downhole tool 300, 600 relative to the wellbore 104. However, the method (850) may also comprise conveying (880) the downhole tool 300, 600 to other axial locations in the wellbore 104 and repeating (885) the transmitting (860), sensing (865), and evaluating (870) with the same or different combinations of individual transmitters and corresponding receivers until the evaluated portions of the downhole feature collectively extend through about 360 degrees at each axial location in the wellbore. Such operation may be periodic, with the downhole tool 300, 600 stopping at each axial location in the wellbore, or substantially continuous as the downhole tool 300, 600 is conveyed substantially continuously through the range of depths being investigated. During such conveyance (880), the downhole tool 300, 600 may rotate within the wellbore 104 due to friction with the sidewalls of the wellbore 104, encountering irregular features or obstructions within the wellbore 104, and/or other forces. Such rotation is unintentional, however, and may be accounted for via data obtained from orientation sensors of the downhole tool 300, 600 and/or other means.

The evaluated portions of the downhole feature during the repeated (875, 885) transmitting (860), sensing (865), and evaluating (870) may also overlap neighboring portions. For example, each evaluated portion may extend through about 180 degrees, and may be centered at azimuthal intervals of about 90 degrees, such that each evaluation portion overlaps each neighboring portion by about 90 degrees. However, other implementations are also within the scope of the present disclosure, including evaluated portions that extend through about 90 degrees and/or other ranges, and that are centered at azimuthal intervals of about 45 degrees and/or other intervals.

During the analysis of each axial and azimuthal region of the downhole feature, the individual transmitter 328, 456, 457 being operated may be operated as a unipole, synthetized unipole (via algebraic composition from multiple excitations, as described above), dipole, quadrupole, or other multiple transmitter. For example, the transmitter may be operated as a multipole transmitter, the downhole feature may be the formation 102 penetrated by the wellbore 104, and the evaluated (870) characteristic may be an elastic property of the formation 102. In other examples, the transmitter may be operated as a unipole transmitter, the downhole feature may be the formation 102, and the characteristic may be an intrinsic anisotropic property, a stress-induced anisotropic property, an azimuthally heterogeneous property, and/or another elastic property of the formation 102.

In other examples, conveying (855, 880) the downhole tool 300, 600 within the wellbore 104 may comprise conveying the downhole tool 300, 600 towards a specific subterranean formation penetrated by the wellbore 104, and the evaluated (870) characteristic may be position of the downhole tool 300, 600 relative to a boundary of the formation, such as to identify when the downhole tool 300, 600 reaches the boundary. In such implementations, the individual transmitter 328, 456, 457 being operated during the analysis of each axial and azimuthal region may be operated as a unipole transmitter.

In other examples, the evaluated (870) characteristic may be diameter of the wellbore 104. In such implementations, the individual transmitter 328, 456, 457 being operated during the analysis of each axial and azimuthal region may be operated as a unipole transmitter.

The examples described above are not intended to be limiting to the scope of the present disclosure. For example, the downhole feature may also be a fracture in the formation 102.

Figure 27:
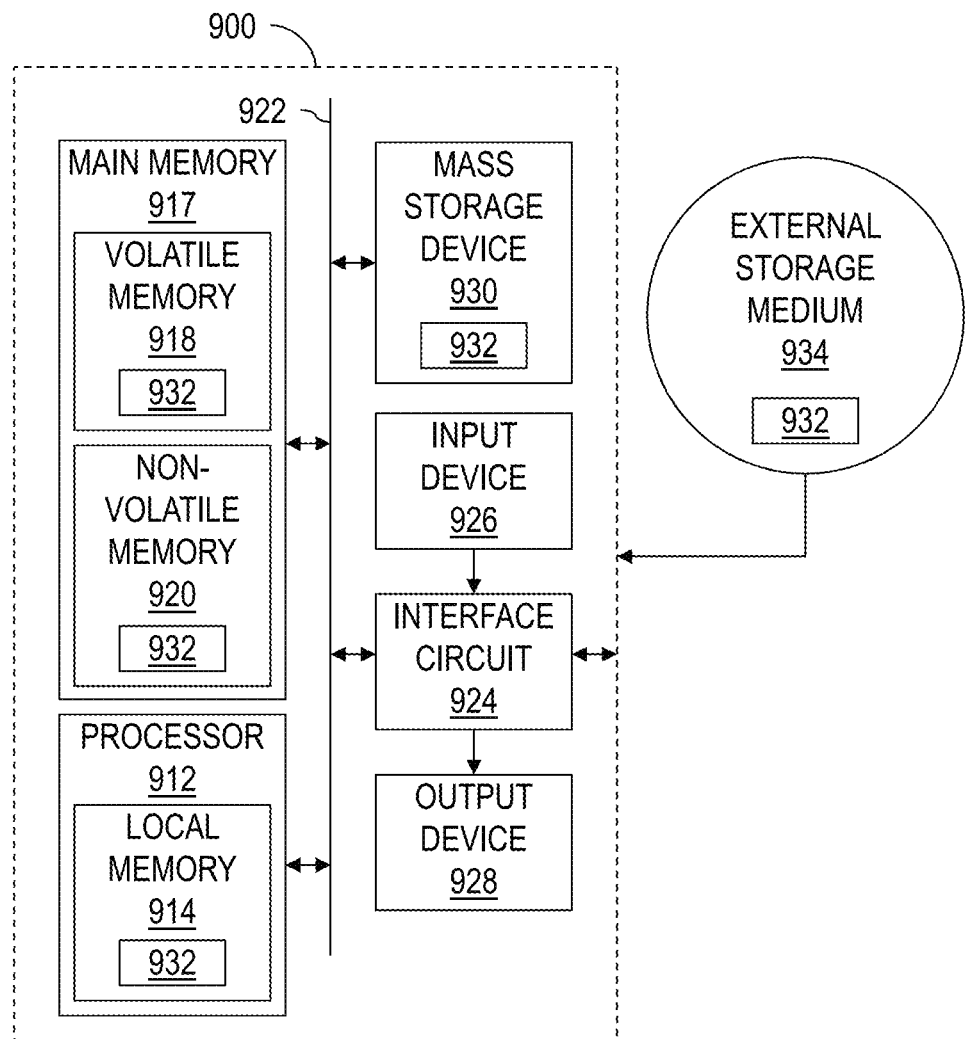
FIG. 27 is a schematic view of at least a portion of an example implementation of apparatus according to one or more aspects of the present disclosure.

FIG. 27 is a schematic view of at least a portion of an example implementation of a processing system 900 according to one or more aspects of the present disclosure. The processing system 900 may execute example machine-readable instructions to implement at least a portion of one or more of the methods and/or processes described herein, and/or to implement a portion of one or more of the example downhole tools described herein. The processing system 900 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 900 shown in FIG. 27 is implemented within downhole apparatus described above, one or more components or functions of the processing system 900 may also or instead be implemented in wellsite surface equipment, perhaps including the surface equipment 190 depicted in FIG. 1, the surface equipment 290 depicted in FIG. 2, and/or other surface equipment.

The processing system 900 may comprise a processor 912, such as a general-purpose programmable processor, for example. The processor 912 may comprise a local memory 914, and may execute program code instructions 932 present in the local memory 914 and/or another memory device. The processor 912 may execute, among other things, machine-readable instructions or programs to implement the methods and/or processes described herein. The programs stored in the local memory 914 may include program instructions or computer program code that, when executed by an associated processor, cause a controller and/or control system implemented in surface equipment and/or a downhole tool to perform tasks as described herein. The processor 912 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 912 may be in communication with a main memory 917, such as via a bus 922 and/or other communication means. The main memory 917 may comprise a volatile memory 918 and a non-volatile memory 920. The volatile memory 918 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 920 may be, comprise, or be implemented by read-only memory, flash memory, and/or other types of memory devices. One or more memory controllers (not shown) may control access to the volatile memory 918 and/or the non-volatile memory 920.

The processing system 900 may also comprise an interface circuit 924. The interface circuit 924 may be, comprise, or be implemented by various types of standard interfaces, such as an Ethernet interface, a universal serial bus (USB), a third generation input/output (3 GIO) interface, a wireless interface, and/or a cellular interface, among other examples. The interface circuit 924 may also comprise a graphics driver card. The interface circuit 924 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 926 may be connected to the interface circuit 924. One or more of the input devices 926 may permit a user to enter data and/or commands for utilization by the processor 912. Each input device 926 may be, comprise, or be implemented by a keyboard, a mouse, a touchscreen, a track-pad, a trackball, an image/code scanner, and/or a voice recognition system, among other examples.

One or more output devices 928 may also be connected to the interface circuit 924. One or more of the output devices 928 may be, comprise, or be implemented by a display device, such as a liquid crystal display (LCD), a light-emitting diode (LED) display, and/or a cathode ray tube (CRT) display, among other examples. One or more of the output devices 928 may also or instead be, comprise, or be implemented by a printer, speaker, and/or other examples.

The processing system 900 may also comprise a mass storage device 930 for storing machine-readable instructions and data. The mass storage device 930 may be connected to the interface circuit 924, such as via the bus 922. The mass storage device 930 may be or comprise a floppy disk drive, a hard disk drive, a compact disk (CD) drive, and/or digital versatile disk (DVD) drive, among other examples. The program code instructions 932 may be stored in the mass storage device 930, the volatile memory 918, the non-volatile memory 920, the local memory 914, and/or on a removable storage medium 934, such as a CD or DVD.

The mass storage device 930, the volatile memory 918, the non-volatile memory 920, the local memory 914, and/or the removable storage medium 934 may each be a tangible, non-transitory storage medium. The modules and/or other components of the processing system 900 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

As described above, apparatus according to one or more aspects introduced in the present disclosure may comprise multiple, azimuthally distributed acoustic sources operable for monopole, dipole, quadrupole, and other multipole excitations, as well as for unipole excitations at each azimuthal position of the transmitters. Such apparatus may also comprise one or more axially spaced receiver arrays each comprising multiple, azimuthally distributed acoustic receivers operable for measuring multipole modes (via mode-decomposition) and unipole modes, including synthesized unipole modes via algebraic composition from multipole excitations. Such apparatus can conduct 360-degree azimuthal measurements without intentional physical rotation. Conventional acoustic logging tools implemented with means for physical rotation have generally been costly and complex. Furthermore, such rotation has been found to limit logging speed, which increases the cost of logging operations due to longer rig time. Moreover, apparatus comprising multiple, azimuthally distributed acoustic sources and receivers according to one or more aspects of the present disclosure may permit LWD operations when the BHA is not rotating, such as during pulling-out-of-hole and sliding modes.

As also described above, apparatus according to one or more aspects introduced in the present disclosure may be utilized for acoustic logging at about 100 kHz and/or other frequencies higher than conventional logging, perhaps in combination with logging at about 30 kHz and/or other lower frequencies. Such apparatus may be utilized for high-spatial resolution measurement of formation elastic properties through refracted waves and borehole modes with multipole excitations, for example. Accordingly, apparatus and/or operations according to one or more aspects of the present disclosure may permit spatial resolution that is higher than previously attainable via acoustic logging, including analysis of target formations at different depths of investigation (DOI).

Apparatus according to one or more aspects introduced in the present disclosure may be utilized in open-hole applications for high-spatial resolution measurement of formation fractures and formation elastic properties through refracted waves and borehole modes with multipole, unipole, and/or synthesized unipole excitations. As described above, unipole excitation can be achieved by exciting each of the azimuthally distributed transmitters one by one. Synthesized unipole excitations can be achieved by processing multipole waveforms through algebraic composition. The elastic formation properties may include intrinsic and/or stress-induced anisotropy, as well as azimuthal heterogeneity. Moreover, the azimuthal heterogeneity of formations (e.g., bedding intersecting a horizontal wellbore portion) may be analyzed without rotating the apparatus.

Apparatus according to one or more aspects introduced in the present disclosure may also be utilized in open-hole implementations for measurement of tool position relative to the formation surface and/or borehole sizes (caliper) with unipole or synthetized unipole excitations. For example, the accuracy of conventional acoustic caliper tools with monopole acquisition can be limited by eccentering of the tool within the wellbore, while apparatus according to one or more aspects of the present disclosure may more accurately estimate the eccentering amount, such as via high-frequency unipole operations.

Apparatus according to one or more aspects introduced in the present disclosure may also be utilized in cased-hole implementations for high-azimuthal resolution measurement of RCBL (Radial Cement Bond Log) through casing arrival amplitude, attenuation, and/or transit time analysis, as well as for measurement of tool position relative to the casing surface and/or casing sizes (caliper), with unipole or synthetized unipole excitations. For example, the eccentering effect on amplitude-based RCBL may be mitigated by also analyzing attenuation. The azimuthally distributed sources may be utilized to determine the tool position in the casing, such that the eccentering effect can be corrected. Combination of amplitude- and attenuation-based logs may also permit interpretation of coupling attenuation (attenuation in front of transmitter) and casing attenuation (attenuation along the casing).

Apparatus according to one or more aspects introduced in the present disclosure may also be utilized in cased-hole implementations for CBL or synthetized CBL at high frequencies (e.g., about 100 kHz) using data acquired at multiple azimuthal positions from unipole or synthetized unipole excitations after correcting the eccentering effect. The accuracy of conventional CBL is limited by tool eccentering. However, CBL or synthesized CBL utilizing apparatus according to one or more aspects introduced in the present disclosure can achieve a CBL log that has been corrected to account for eccentering.

Apparatus according to one or more aspects introduced in the present disclosure may also be utilized for CBL and RCBL in dual-casing implementations, including for evaluating just the first (inner) casing. For example, conventional CBL measurements can be limited when used with multiple casings, such as due to the contamination from the second casing arrivals and mode excitation different from single casing. However, apparatus according to one or more aspects introduced in the present disclosure may be utilized with high-frequency CBL and RCBL to accurately evaluate bonding around the first casing.

Apparatus according to one or more aspects introduced in the present disclosure may also be utilized in cased-hole implementations for CBL and RCBL in casing surrounded by formations having compressional slowness faster than about 200 μs/m. In contrast, conventional CBL apparatus and operations can be limited by the impact of fast formation arrivals. Apparatus according to one or more aspects introduced in the present disclosure may also be utilized with high frequency CBL and RCBL to evaluate bonding around the casing, including between multiple casings.

In view of the entirety of the present disclosure, including the figures and the claims, a person having ordinary skill in the art will readily recognize that the present disclosure introduces a method comprising: (A) transmitting an acoustic signal from a transmitter of a downhole tool positioned within a wellbore; and (B) sensing an attribute of the acoustic signal with each of a plurality of receivers of the downhole tool, wherein the receivers include: (i) a first receiver axially offset from and azimuthally aligned with the transmitter; (ii) a second receiver axially offset from and azimuthally aligned with the transmitter and the first receiver; (iii) a third receiver axially and azimuthally offset from the transmitter; and (iv) a fourth receiver axially and azimuthally offset from the transmitter, the first receiver, and the third receiver.

The third receiver may be azimuthally offset from the transmitter, the first receiver, and the second receiver by about 45 degrees; the fourth receiver may be azimuthally offset from the transmitter, the first receiver, and the second receiver by about 90 degrees; and the fourth receiver may be azimuthally offset from the third receiver by about 45 degrees.

The first and third receivers may not be axially offset, and the second and fourth receivers may not be axially offset.

The downhole tool may comprise a first sensor array and a second sensor array. For example, the first sensor array may comprise a first plurality of sensors azimuthally distributed around a longitudinal axis of the downhole tool at a first axial location, wherein the first plurality of sensors may comprise the first and third receivers, and the second sensor array may comprise a second plurality of sensors azimuthally distributed around the longitudinal axis of the downhole tool at a second axial location, wherein the second plurality of sensors may comprise the second and fourth receivers.

The first and second receivers may be substantially aligned with a first acoustic path of the acoustic signal that extends along a substantially axial path along the downhole tool between the transmitter and the second receiver, and the third and fourth receivers may be substantially aligned with a second acoustic path of the acoustic signal that extends along a substantially non-axial, angle path along the downhole tool between the transmitter and the fourth receiver.

Cement may substantially surround a casing within the wellbore, and the method may comprise evaluating a characteristic of the cement utilizing the acoustic signal attribute sensed by each of the first, second, third, and fourth receivers. The cement characteristic may be bonding quality between the cement and the casing. For example, the acoustic signal attribute may be attributes such as amplitude, attenuation, and/or transit time.

The wellbore may extend into a subterranean formation, and the method may comprise evaluating a characteristic of the formation utilizing the acoustic signal attribute sensed by each of the first, second, third, and fourth receivers. The formation characteristic may exhibit azimuthal and/or radial heterogeneity and/or anisotropy. For example, the formation characteristic may be an elastic property, such as mechanical stress, compression, and/or shear wave propagation velocity. In such implementations, among others within the scope of the present disclosure, the acoustic signal attribute may be attributes such as amplitude, attenuation, and/or transit time.

The acoustic signal may be a waveform having a frequency not greater than about 30 kHz. The acoustic signal may be a waveform having a frequency not less than about 100 kHz. The acoustic signal may be a waveform having a frequency above 30 kHz and below 500 kHz. Other implementations are also within the scope of the present disclosure.

The present disclosure also introduces a method comprising conveying a downhole tool within a wellbore, wherein the downhole tool comprises: a transmitter array comprising a plurality of transmitters azimuthally distributed around a longitudinal axis of the downhole tool at a first axial location of the downhole tool; a first receiver array comprising a plurality of first receivers azimuthally distributed around the longitudinal axis at a second axial location axially offset from the first axial location; and a second receiver array comprising a plurality of second receivers azimuthally distributed around the longitudinal axis at a third axial location axially offset from the first and second axial locations. The method also comprises: transmitting a first acoustic signal from a first one of the transmitters; sensing an attribute of the first acoustic signal with at least first and second ones of the first receivers and at least first and second ones of the second receivers; evaluating a characteristic of a first region based on first signals generated by the at least first and second ones of the first receivers and the at least first and second ones of the second receivers, wherein the first signals are each indicative of the sensed attribute of the first acoustic signal; transmitting a second acoustic signal from a second one of the transmitters; sensing the attribute of the second acoustic signal with at least third and fourth ones of the first receivers and at least third and fourth ones of the second receivers; and evaluating a characteristic of a second region based on second signals generated by the at least third and fourth ones of the first receivers and the at least third and fourth ones of the second receivers, wherein the second signals are each indicative of the sensed attribute of the second acoustic signal. The first and second regions are either: regions of cement substantially surrounding a casing within the wellbore; or regions of a subterranean formation into which the wellbore extends.

The plurality of transmitters may comprise four transmitters azimuthally spaced apart at increments of about 90 degrees. The pluralities of first and second receivers may each comprise eight receivers azimuthally spaced apart at increments of about 45 degrees. For example: the first ones of the first and second receivers may be azimuthally aligned with the first transmitter; the second one of the first receivers may be azimuthally offset from the first transmitter by about 45 degrees; and the second one of the second receivers may be azimuthally offset from the first transmitter by about 90 degrees. In such implementations, among others within the scope of the present disclosure: the third ones of the first and second receivers may be azimuthally aligned with the second transmitter; the fourth one of the first receivers may be azimuthally offset from the second transmitter by about 45 degrees; and the fourth one of the second receivers may be azimuthally offset from the second transmitter by about 90 degrees.

The present disclosure also introduces a method comprising conveying a downhole tool within a wellbore, wherein the downhole tool comprises: a transmitter array comprising a plurality of transmitters azimuthally spaced around a longitudinal axis of the downhole tool at a first axial location of the downhole tool; a first receiver array comprising a plurality of first receivers azimuthally spaced around the longitudinal axis at a second axial location axially offset from the first axial location; and a second receiver array comprising a plurality of second receivers azimuthally spaced around the longitudinal axis at a third axial location axially offset from the first and second axial locations. The method also comprises: transmitting an acoustic signal from an individual one of the transmitters; sensing an attribute of the acoustic signal with individual ones of the first and second receivers, wherein the individual ones of the first and second receivers include at least two of the first receivers and at least two of the second receivers; evaluating a characteristic of a portion of a downhole feature based on response signals generated by each of the individual ones of the first and second receivers, wherein each response signal is indicative of the acoustic signal attribute sensed by the corresponding individual one of the first and second receivers, and wherein the portion azimuthally corresponds to two of the individual ones of the first and second receivers having the greatest relative azimuthal offset; and repeating the transmitting, sensing, and evaluating with different individual ones of the transmitters and corresponding first and second receivers until the evaluated portions of the downhole feature collectively extend through about 360 degrees around the longitudinal axis.

The evaluated portions may be centered at azimuthal intervals of about 90 degrees.

The evaluated portions may be centered at azimuthal intervals of about 45 degrees.

The individual ones of the first and second receivers may include: a first one of the first receivers azimuthally aligned with the individual transmitter; a second one of the first receivers azimuthally offset from the individual transmitter; a first one of the second receivers azimuthally aligned with the individual transmitter; and a second one of the second receivers azimuthally offset from the individual transmitter and the second one of the first receivers.

The individual ones of the first and second receivers may include: a first one of the first receivers azimuthally aligned with the individual transmitter; a second one of the first receivers azimuthally offset from the individual transmitter in a first direction; a third one of the first receivers azimuthally offset from the individual transmitter in a second direction opposite the first direction; a first one of the second receivers azimuthally aligned with the individual transmitter; a second one of the second receivers azimuthally offset from the individual transmitter and the second one of the first receivers in the first direction; and a third one of the second receivers azimuthally offset from the individual transmitter and the third one of the first receivers in the second direction.

The downhole feature may be cement substantially surrounding a casing within the wellbore. For example, the characteristic may be bonding quality between the cement and the casing.

The downhole feature may be a subterranean formation penetrated by the wellbore.

The method may exclude intentionally rotating the downhole tool relative to the wellbore.

The individual transmitter may be operated as a unipole transmitter.

The individual transmitted may be operated as a synthetized unipole transmitter via algebraic composition from multiple excitations.

The individual transmitter may be operated as a multipole transmitter, the downhole feature may be a subterranean formation penetrated by the wellbore, and the characteristic may be an elastic property of the subterranean formation.

The individual transmitter may be operated as a unipole transmitter, the downhole feature may be a subterranean formation penetrated by the wellbore, and the characteristic may be an elastic property of the subterranean formation. The elastic property may be selected from the group consisting of: an intrinsic, anisotropic property; a stress-induced, anisotropic property; and an azimuthally heterogeneous property.

Conveying the downhole tool within the wellbore may comprise conveying the downhole tool towards a subterranean formation penetrated by the wellbore, the characteristic may be position of the downhole tool relative to a boundary of the subterranean formation, and the individual transmitter may be operated as a unipole transmitter.

The characteristic may be diameter of the wellbore, and the individual transmitter may be operated as a unipole transmitter.

The downhole feature may be a fracture in a subterranean formation penetrated by the wellbore.

The present disclosure also introduces a method comprising: (A) conveying a downhole tool within a wellbore, wherein the downhole tool comprises: (i) a transmitter array comprising a plurality of transmitters azimuthally spaced around a longitudinal axis of the downhole tool at a first axial location of the downhole tool; (ii) a first receiver array comprising a plurality of first receivers azimuthally spaced around the longitudinal axis at a second axial location axially offset from the first axial location; and (iii) a second receiver array comprising a plurality of second receivers azimuthally spaced around the longitudinal axis at a third axial location axially offset from the first and second axial locations; (B) transmitting an acoustic signal from an individual one of the transmitters; (C) sensing an attribute of the acoustic signal with individual ones of the first and second receivers, wherein the individual ones of the first and second receivers include at least two of the first receivers and at least two of the second receivers; (D) evaluating a characteristic of a portion of a downhole feature based on response signals generated by each of the individual ones of the first and second receivers, wherein each response signal is indicative of the acoustic signal attribute sensed by the corresponding individual one of the first and second receivers, and wherein the portion azimuthally corresponds to two of the individual ones of the first and second receivers having the greatest relative azimuthal offset; and (E) repeating the transmitting, sensing, and evaluating with different individual ones of the transmitters and corresponding first and second receivers until the evaluated portions of the downhole feature collectively extend through about 360 degrees around the longitudinal axis.

The individual ones of the first and second receivers may include: a first one of the first receivers azimuthally aligned with the individual transmitter; a second one of the first receivers azimuthally offset from the individual transmitter; a first one of the second receivers azimuthally aligned with the individual transmitter; and a second one of the second receivers azimuthally offset from the individual transmitter.

The individual ones of the first and second receivers may include: a first one of the first receivers azimuthally aligned with the individual transmitter; a second one of the first receivers azimuthally offset from the individual transmitter in a first direction; a third one of the first receivers azimuthally offset from the individual transmitter in a second direction opposite the first direction; a first one of the second receivers azimuthally aligned with the individual transmitter; a second one of the second receivers azimuthally offset from the individual transmitter in the first direction; and a third one of the second receivers azimuthally offset from the individual transmitter in the second direction.

The downhole feature may be cement substantially surrounding a casing within the wellbore, and the characteristic may be bonding quality between the cement and the casing. In such implementations, among others within the scope of the present disclosure, the wellbore may penetrate a subterranean formation having a compressional slowness that is faster than compressional slowness of the casing. The casing may be one of a plurality of nested casings within the wellbore.

The downhole feature may be a subterranean formation penetrated by the wellbore.

Evaluating the downhole feature portion characteristic may comprise generating a synthetic cement bond logging (CBL) curve, indicative of quality of cement bonding around a casing in the wellbore, based on data acquired via the initial and repeated sensing through about 360 degrees around the longitudinal axis. The CBL curve may be equivalent to a conventional 3-ft CBL for quality of cement bonding around casing.

The individual transmitter may be operated as either: a unipole transmitter; or a synthetized unipole transmitter, via algebraic composition from multiple excitations.

The individual transmitter may be operated as a multipole transmitter, the downhole feature may be a subterranean formation penetrated by the wellbore, and the characteristic may be an elastic property of the subterranean formation.

The individual transmitter may be operated as a unipole transmitter, the downhole feature may be a subterranean formation penetrated by the wellbore, and the characteristic may be an elastic property of the subterranean formation. The elastic property may be selected from the group consisting of: an intrinsic, anisotropic property; a stress-induced, anisotropic property; and an azimuthally heterogeneous property.

Conveying the downhole tool within the wellbore may comprise conveying the downhole tool towards a subterranean formation penetrated by the wellbore, and the characteristic may be position of the downhole tool relative to a boundary of the subterranean formation, in which case the individual transmitter may be operated as a unipole transmitter.

The characteristic may be diameter of the wellbore, in which case the individual transmitter may be operated as a unipole transmitter.

The acoustic signal may be a waveform having a frequency above 30 kHz and below 500 kHz.

The transmitter array may be a first transmitter array, the downhole tool may further comprise a second transmitter array comprising a plurality of transmitters azimuthally spaced around the longitudinal axis at a fourth axial location, and the method may further comprise utilizing data obtained via utilization of the first and second transmitter arrays to compensate for tilt of the downhole tool relative to the wellbore and/or a casing within the wellbore. The second and third axial locations may each be between the first and fourth axial locations.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
  conveying a downhole tool within a wellbore, wherein the downhole tool comprises:
    a transmitter array comprising a plurality of transmitters azimuthally spaced around a longitudinal axis of the downhole tool at a first axial location of the downhole tool;
    a first receiver array comprising a plurality of first receivers azimuthally spaced around the longitudinal axis at a second axial location axially offset from the first axial location; and
    a second receiver array comprising a plurality of second receivers azimuthally spaced around the longitudinal axis at a third axial location axially offset from the first and second axial locations;
  transmitting an acoustic signal from an individual one of the transmitters, wherein the other transmitters of the plurality do not transmit an acoustic signal simultaneously with the individual one of the transmitters;
  sensing an attribute of the acoustic signal with individual receivers of a subset of the first and second receivers, wherein the subset includes at least two of the first receivers and at least two of the second receivers, wherein at least an individual one of the first and second receivers is not part of the subset;
  evaluating a characteristic of a portion of a downhole feature based on response signals generated by each of the individual receivers of the subset, wherein each response signal is indicative of the acoustic signal attribute sensed by the corresponding individual receivers of the subset, and wherein the portion azimuthally corresponds to two of the individual receivers of the subset having the greatest relative azimuthal offset; and
  repeating the transmitting, sensing, and evaluating with different individual ones of the transmitters and corresponding subset of first and second receivers until the evaluated portions of the downhole feature collectively extend through about 360 degrees around the longitudinal axis.

2. The method of claim 1 wherein the individual receivers of the subset consist of:
  a first one of the first receivers azimuthally aligned with the individual transmitter;
  a second one of the first receivers azimuthally offset from the individual transmitter;
  a first one of the second receivers azimuthally aligned with the individual transmitter; and
  a second one of the second receivers azimuthally offset from the individual transmitter.

3. The method of claim 1 wherein the individual receivers of the subset consist of:
  a first one of the first receivers azimuthally aligned with the individual transmitter;
  a second one of the first receivers azimuthally offset from the individual transmitter in a first direction;
  a third one of the first receivers azimuthally offset from the individual transmitter in a second direction opposite the first direction;
  a first one of the second receivers azimuthally aligned with the individual transmitter;
  a second one of the second receivers azimuthally offset from the individual transmitter in the first direction; and
  a third one of the second receivers azimuthally offset from the individual transmitter in the second direction.

4. The method of claim 1 wherein the downhole feature is cement substantially surrounding a casing within the wellbore, and wherein the characteristic is bonding quality between the cement and the casing.

5. The method of claim 4 wherein the wellbore penetrates a subterranean formation having a compressional slowness that is faster than compressional slowness of the casing.

6. The method of claim 1 wherein the downhole feature is a subterranean formation penetrated by the wellbore.

7. The method of claim 1 wherein evaluating the downhole feature portion characteristic comprises generating a synthetic cement bond logging (CBL) curve, indicative of quality of cement bonding around a casing in the wellbore, based on data acquired via the initial and repeated sensing through about 360 degrees around the longitudinal axis.

8. The method of claim 1 wherein the individual transmitter is operated as either:
  a unipole transmitter; or
  a synthetized unipole transmitter, via algebraic composition from multiple excitations.

9. The method of claim 1 wherein:
  the individual transmitter is operated as a multipole transmitter;
  the downhole feature is a subterranean formation penetrated by the wellbore; and
  the characteristic is an elastic property of the subterranean formation.

10. The method of claim 1 wherein:
  the individual transmitter is operated as a unipole transmitter;
  the downhole feature is a subterranean formation penetrated by the wellbore; and
  the characteristic is an elastic property of the subterranean formation.

11. The method of claim 10 wherein the elastic property is selected from the group consisting of:
  an intrinsic, anisotropic property;
  a stress-induced, anisotropic property; and
  an azimuthally heterogeneous property.

12. The method of claim 1 wherein:
  conveying the downhole tool within the wellbore comprises conveying the downhole tool towards a subterranean formation penetrated by the wellbore;
  the characteristic is position of the downhole tool relative to a boundary of the subterranean formation; and
  the individual transmitter is operated as a unipole transmitter.

13. The method of claim 1 wherein:
the characteristic is diameter of the wellbore; and
the individual transmitter is operated as a unipole transmitter.

14. The method of claim 1 wherein the acoustic signal is a waveform having a frequency above 30 kHz and below 500 kHz.

15. The method of claim 1 wherein:
the transmitter array is a first transmitter array;
the downhole tool further comprises a second transmitter array comprising a plurality of transmitters azimuthally spaced around the longitudinal axis at a fourth axial location; and
the method further comprises utilizing data obtained via utilization of the first and second transmitter arrays to compensate for tilt of the downhole tool relative to the wellbore and/or a casing within the wellbore.

16. The method of claim 15 wherein the second and third axial locations are each between the first and fourth axial locations.

17. A method comprising:
conveying a downhole tool within a wellbore, wherein the downhole tool comprises:
a transmitter array comprising a plurality of transmitters azimuthally distributed around a longitudinal axis of the downhole tool at a first axial location of the downhole tool;
a first receiver array comprising a plurality of first receivers azimuthally distributed around the longitudinal axis at a second axial location axially offset from the first axial location; and
a second receiver array comprising a plurality of second receivers azimuthally distributed around the longitudinal axis at a third axial location axially offset from the first and second axial locations;
transmitting a first acoustic signal from a first one of the transmitters, wherein the other transmitters of the plurality do not transmit an acoustic signal simultaneously to the first acoustic signal;
sensing an attribute of the first acoustic signal with a first subset of the first and second receivers comprising at least first and second ones of the first receivers and at least first and second ones of the second receivers, wherein at least an individual one of the first and second receivers is not part of the first subset;
evaluating a characteristic of a first region based on first signals generated by the at least first and second ones of the first receivers and the at least first and second ones of the second receivers, wherein the first signals are each indicative of the sensed attribute of the first acoustic signal;
transmitting a second acoustic signal from a second one of the transmitters, wherein the other transmitters of the plurality do not transmit an acoustic signal simultaneously to the second acoustic signal;
sensing the attribute of the second acoustic signal with a second subset of the first and second receivers comprising at least third and fourth ones of the first receivers and at least third and fourth ones of the second receivers, wherein at least an individual one of the first and second receivers is not part of the second subset; and
evaluating a characteristic of a second region based on second signals generated by the at least third and fourth ones of the first receivers and the at least third and fourth ones of the second receivers, wherein the second signals are each indicative of the sensed attribute of the second acoustic signal;
wherein the first and second regions are either:
regions of cement substantially surrounding a casing within the wellbore; or
regions of a subterranean formation into which the wellbore extends.

18. The method of claim 17 wherein:
the first ones of the first and second receivers are azimuthally aligned with the first transmitter;
the second one of the first receivers is azimuthally offset from the first transmitter by about 45 degrees;
the second one of the second receivers is azimuthally offset from the first transmitter by about 90 degrees;
the third ones of the first and second receivers are azimuthally aligned with the second transmitter;
the fourth one of the first receivers is azimuthally offset from the second transmitter by about 45 degrees; and
the fourth one of the second receivers is azimuthally offset from the second transmitter by about 90 degrees.

* * * * *